(12) United States Patent
Ingersoll et al.

(10) Patent No.: US 9,051,834 B2
(45) Date of Patent: *Jun. 9, 2015

(54) METHODS AND DEVICES FOR OPTIMIZING HEAT TRANSFER WITHIN A COMPRESSION AND/OR EXPANSION DEVICE

(71) Applicant: General Compression, Inc., Newton, MA (US)

(72) Inventors: Eric D. Ingersoll, Cambridge, MA (US); Justin A. Aborn, Hingham, MA (US); Matthew Blieske, Francistown, NH (US); Iain Ridley, Arlington, MA (US)

(73) Assignee: General Compression, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,825

(22) Filed: May 6, 2013

(65) Prior Publication Data

US 2014/0109566 A1    Apr. 24, 2014

Related U.S. Application Data

(63) Continuation of application No. 12/977,679, filed on Dec. 23, 2010, now Pat. No. 8,454,321, which is a continuation-in-part of application No. 12/785,086, filed on May 21, 2010, now Pat. No. 8,359,857.

(60) Provisional application No. 61/216,942, filed on May 22, 2009, provisional application No. 61/290,107, filed on Dec. 24, 2009.

(51) Int. Cl.
*F04F 99/00* (2009.01)
*F16D 31/02* (2006.01)
(Continued)

(52) U.S. Cl.
CPC .............. *F01B 29/08* (2013.01); *F03D 9/028* (2013.01); *F28D 15/00* (2013.01); *F28D 15/02* (2013.01); *Y02E 10/72* (2013.01); *Y02E 60/15* (2013.01); *F01B 31/08* (2013.01); *F04B 49/08* (2013.01)

(58) Field of Classification Search
CPC .......... F01B 29/08; F01B 31/08; F04B 49/08; F28D 15/00; F28D 15/02; F03D 9/028; Y02E 10/72; Y02E 60/15
USPC ................................. 417/92; 92/144; 60/456
See application file for complete search history.

(56) References Cited

U.S. PATENT DOCUMENTS

| 37,258 A | 12/1862 | Miller |
|---|---|---|
| 1,045,961 A | 12/1912 | Ferranti |

(Continued)

FOREIGN PATENT DOCUMENTS

| GB | 2013318 A | 8/1979 |
|---|---|---|
| WO | WO-90/03516 A1 | 4/1990 |

(Continued)

OTHER PUBLICATIONS

Ahrens, F. W., "Preliminary Evaluation of the Use of Hydraulic Air Compressors in Water-Compensated Reservoir Compressed Air Storage Power Plants," NTIS, Prepared for CAES Technology Symposium 1978, May 15-17, 1978, Pacific Grove, CA, Argonne National Laboratory, Argonne, Illinois, 24 pages.

(Continued)

*Primary Examiner* — Charles Freay
(74) *Attorney, Agent, or Firm* — Goodwin Procter LLP

(57) ABSTRACT

Systems, methods and devices for optimizing heat transfer within a device or system used to compress and/or expand a gas, such as air, are described herein. For example, systems, methods and devices for optimizing the heat transfer within an air compression and expansion energy storage system are described herein. A compressor and/or expander device can include one or more of various embodiments of a heat transfer element that can be disposed within an interior of a cylinder or pressure vessel used in the compression and/or expansion of a gas, such as air. Such devices can include hydraulic and/or pneumatic actuators to move a fluid (e.g., liquid or gas) within the cylinder or pressure vessel. The heat transfer element can be used to remove heat energy generated during a compression and/or expansion process.

20 Claims, 11 Drawing Sheets

(51) Int. Cl.
  *F01B 29/08*  (2006.01)
  *F03D 9/02*  (2006.01)
  *F28D 15/00*  (2006.01)
  *F28D 15/02*  (2006.01)
  *F01B 31/08*  (2006.01)
  *F04B 49/08*  (2006.01)

(56) References Cited

U.S. PATENT DOCUMENTS

| | | |
|---|---|---|
| 1,230,028 A | 6/1917 | Rardon |
| 1,918,789 A | 7/1933 | Titsworth |
| 1,947,304 A | 2/1934 | Morro |
| 2,005,515 A | 6/1935 | Winkler |
| 2,145,540 A | 1/1939 | Ellis |
| 2,339,086 A | 1/1944 | Makaroff |
| 2,479,856 A | 8/1949 | Mitton |
| 2,898,183 A | 8/1959 | Fauser |
| 3,014,639 A | 12/1961 | Boli |
| 3,100,965 A | 8/1963 | Blackburn |
| 3,232,524 A | 2/1966 | Rice at al. |
| 3,530,681 A | 9/1970 | Dehne |
| 3,618,470 A | 11/1971 | Muelier et al. |
| 3,633,663 A | 1/1972 | Tafel |
| 3,648,458 A | 3/1972 | McAlister |
| 3,677,008 A | 7/1972 | Koutz |
| 3,792,643 A | 2/1974 | Scheafer |
| 3,818,801 A | 6/1974 | Kime |
| 3,832,851 A | 9/1974 | Kiernan |
| 3,854,301 A | 12/1974 | Cytryn |
| 3,901,033 A | 8/1975 | McAlister |
| 3,958,899 A | 5/1976 | Coleman, Jr. et al. |
| 3,968,732 A | 7/1976 | Fitzgerald |
| 4,150,547 A | 4/1979 | Hobson |
| 4,215,548 A | 8/1980 | Beremand |
| 4,242,878 A | 1/1981 | Brinkerhoff |
| 4,348,863 A | 9/1982 | Taylor et al. |
| 4,466,244 A | 8/1984 | Wu |
| 4,478,556 A | 10/1984 | Gozzi |
| 4,537,558 A | 8/1985 | Tsunoda et al. |
| 4,561,494 A | 12/1985 | Frost |
| 4,585,039 A | 4/1986 | Hamilton |
| 4,593,202 A | 6/1986 | Dickinson |
| 4,603,551 A | 8/1986 | Wood |
| 4,610,369 A | 9/1986 | Mercier |
| 4,706,685 A | 11/1987 | Jones, Jr. et al. |
| 4,714,411 A | 12/1987 | Searle |
| 4,761,118 A | 8/1988 | Zanarini et al. |
| 4,765,225 A | 8/1988 | Birchard |
| 4,784,579 A | 11/1988 | Gazzera |
| 4,849,648 A | 7/1989 | Longardner |
| 4,959,958 A | 10/1990 | Nishikawa et al. |
| 5,099,648 A | 3/1992 | Angle |
| 5,138,936 A | 8/1992 | Kent |
| 5,142,870 A | 9/1992 | Angle |
| 5,161,865 A | 11/1992 | Higashimata et al. |
| 5,169,295 A | 12/1992 | Stogner et al. |
| 5,179,837 A | 1/1993 | Sieber |
| 5,184,936 A | 2/1993 | Nojima |
| 5,253,619 A | 10/1993 | Richeson et al. |
| 5,259,738 A | 11/1993 | Salter et al. |
| 5,322,418 A | 6/1994 | Comer |
| 5,387,089 A | 2/1995 | Stogner et al. |
| 5,394,695 A | 3/1995 | Sieber |
| 5,537,822 A | 7/1996 | Shnaid et al. |
| 5,564,912 A | 10/1996 | Peck et al. |
| 5,579,640 A | 12/1996 | Gray, Jr. et al. |
| 5,584,664 A | 12/1996 | Elliott et al. |
| 5,622,478 A | 4/1997 | Elliott et al. |
| 5,634,340 A | 6/1997 | Grennan |
| 5,674,053 A | 10/1997 | Paul et al. |
| 5,716,197 A | 2/1998 | Paul et al. |
| 5,769,610 A | 6/1998 | Paul et al. |
| 5,771,693 A | 6/1998 | Coney |
| 5,782,612 A | 7/1998 | Margardt |
| 5,807,083 A | 9/1998 | Tomoiu |
| 5,839,270 A | 11/1998 | Jirnov et al. |
| 5,863,186 A | 1/1999 | Green et al. |
| 5,993,170 A | 11/1999 | Stevens et al. |
| 6,026,349 A | 2/2000 | Heneman |
| 6,052,992 A | 4/2000 | Eroshenko |
| 6,113,357 A | 9/2000 | Dobbs |
| 6,145,311 A | 11/2000 | Cyphelly |
| 6,206,660 B1 | 3/2001 | Coney et al. |
| RE37,603 E | 3/2002 | Coney |
| 6,371,145 B1 | 4/2002 | Bardon |
| 6,371,733 B1 | 4/2002 | Renfro |
| 6,397,794 B1 | 6/2002 | Sanderson et al. |
| 6,446,587 B1 | 9/2002 | Sanderson et al. |
| 6,460,450 B1 | 10/2002 | Sanderson et al. |
| 6,499,288 B1 | 12/2002 | Knight |
| 6,558,134 B2 | 5/2003 | Serafin et al. |
| 6,568,169 B2 | 5/2003 | Conde et al. |
| 6,568,911 B1 | 5/2003 | Brightwell et al. |
| 6,638,024 B1 | 10/2003 | Hancock |
| 6,652,241 B1 | 11/2003 | Alder |
| 6,652,243 B2 | 11/2003 | Krasnov |
| 6,655,155 B2 | 12/2003 | Bishop |
| 6,695,591 B2 | 2/2004 | Grimmer et al. |
| 6,711,984 B2 | 3/2004 | Tagge et al. |
| 6,725,671 B2 | 4/2004 | Bishop |
| 6,733,253 B2 | 5/2004 | Vockroth |
| 6,817,185 B2 | 11/2004 | Coney et al. |
| 6,829,978 B2 | 12/2004 | Sanderson et al. |
| 6,854,377 B2 | 2/2005 | Sanderson et al. |
| 6,913,447 B2 | 7/2005 | Fox et al. |
| 6,915,765 B1 | 7/2005 | Sanderson et al. |
| 6,925,973 B1 | 8/2005 | Sanderson et al. |
| 6,957,632 B1 | 10/2005 | Carlson et al. |
| 6,959,546 B2 | 11/2005 | Corcoran |
| 6,994,104 B2 | 2/2006 | Bishop et al. |
| 6,997,685 B2 | 2/2006 | Lemmen |
| 7,001,158 B2 | 2/2006 | Dunn |
| 7,007,589 B1 | 3/2006 | Sanderson |
| 7,011,469 B2 | 3/2006 | Sanderson et al. |
| 7,021,602 B2 | 4/2006 | Davis et al. |
| 7,210,496 B2 | 5/2007 | Suzuki |
| 7,219,682 B2 | 5/2007 | Agnew et al. |
| 7,257,952 B2 | 8/2007 | Bishop et al. |
| 7,308,361 B2 | 12/2007 | Enis et al. |
| 7,377,492 B2 | 5/2008 | Vrana et al. |
| 7,395,748 B2 | 7/2008 | Krimbacher |
| 7,488,159 B2 * | 2/2009 | Bhatt et al. .............. 417/92 |
| 7,527,482 B2 | 5/2009 | Ursan et al. |
| 7,530,300 B2 | 5/2009 | Hornstein |
| 7,543,668 B1 | 6/2009 | Schechter |
| 7,604,064 B2 | 10/2009 | Irwin, Jr. |
| 7,610,955 B2 | 11/2009 | Irwin, Jr. |
| 7,640,736 B2 | 1/2010 | Arbel et al. |
| 7,656,055 B2 | 2/2010 | Torres et al. |
| 7,663,255 B2 | 2/2010 | Kim et al. |
| 7,696,632 B1 | 4/2010 | Fuller |
| 7,765,225 B2 | 7/2010 | Robert |
| 7,802,426 B2 | 9/2010 | Bollinger |
| 7,832,207 B2 | 11/2010 | McBride et al. |
| 7,874,155 B2 | 1/2011 | McBride et al. |
| 7,900,444 B1 | 3/2011 | McBride et al. |
| 8,359,857 B2 * | 1/2013 | Ingersoll et al. .............. 60/512 |
| 8,454,321 B2 * | 6/2013 | Ingersoll et al. .............. 417/92 |
| 2003/0180155 A1 | 9/2003 | Coney et al. |
| 2005/0180864 A1 | 8/2005 | Ursan et al. |
| 2005/0284155 A1 | 12/2005 | Bhatt et al. |
| 2006/0078445 A1 | 4/2006 | Carter et al. |
| 2006/0218908 A1 | 10/2006 | Abou-Raphael |
| 2006/0248886 A1 | 11/2006 | Ma |
| 2007/0187918 A1 | 8/2007 | Mizuno et al. |
| 2008/0060862 A1 | 3/2008 | Schiele et al. |
| 2008/0163618 A1 | 7/2008 | Paul |
| 2009/0260361 A1 | 10/2009 | Prueitt |
| 2009/0282822 A1 | 11/2009 | McBride et al. |
| 2009/0301089 A1 | 12/2009 | Bollinger |
| 2010/0018196 A1 | 1/2010 | Li et al. |
| 2010/0089063 A1 | 4/2010 | McBride et al. |
| 2010/0139277 A1 | 6/2010 | McBride et al. |

(56) References Cited

U.S. PATENT DOCUMENTS

| | | |
|---|---|---|
| 2010/0205960 A1 | 8/2010 | McBride et al. |
| 2010/0229544 A1 | 9/2010 | Bollinger et al. |
| 2010/0307156 A1 | 12/2010 | Bollinger et al. |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0079010 A1 | 4/2011 | McBride et al. |
| 2011/0083438 A1 | 4/2011 | McBride et al. |
| 2011/0131966 A1 | 6/2011 | McBride et al. |
| 2011/0167813 A1 | 7/2011 | McBride et al. |
| 2011/0258996 A1 | 10/2011 | Ingersoll et al. |
| 2011/0259001 A1 | 10/2011 | McBride et al. |
| 2011/0259442 A1 | 10/2011 | McBride et al. |

FOREIGN PATENT DOCUMENTS

| | | |
|---|---|---|
| WO | WO-93/06367 A1 | 4/1993 |
| WO | WO-98/17492 A1 | 4/1998 |
| WO | WO-2005/069847 A2 | 8/2005 |
| WO | WO-2008/139267 A1 | 11/2008 |
| WO | WO-2009/034548 A2 | 3/2009 |
| WO | WO-2010/135658 A2 | 11/2010 |
| WO | WO-2011/079267 A1 | 6/2011 |
| WO | WO-2011/079271 A2 | 6/2011 |

OTHER PUBLICATIONS

Berghmans, J. A. et al., "Performance of a Hydraulic Air Compressor for Use in Compressed Air Energy Storage Power Systems," Smithsonian/NASA ADS Physics Abstract Service, Presented at Symp. on Fluids Eng. in Advanced Energy Conversion Systems, ASME Winter Ann. Meeting, San Francisco, Dec. 10-15, 1978, 2 pages.

Carbon Trust, "Hydraulic Transmission System for Large Wind Turbines," Jan. 2007, 1 page.

Cyphelly et al., "Usage of Compressed Air Storage Systems," Program Elektricity, Final Report May 2004, Ordered by the Swiss Federal Office of Energy, 14 pages.

Erbe, R., "Water Works: Less Expensive Than Oil and Environmentally Friendly, Water-Based Hydraulics Deserve a Closer Look," Machine Design, Sep. 13, 2007, vol. 116, 5 pages.

Hydraulics & Pneumatics, Piston Pumps [online], [retrieved on Oct. 17, 2007]. Retrieved from the Internet: <URL: http://www.hydraulicspneumatics.com/200/FPE/pumps/article/true/6402>, 2007, Penton Media, Inc., 4 pages.

Hydraulics & Pneumatics, Wobble-Plate Piston Pump [online], [retrieved on Oct. 18, 2007]. Retrieved from the Internet: <URL: http://www.hydraulicspneumatics.com/200/issue/article/true/43640>, 2007, Penton Media, Inc., 13 pages.

International Search Report and Written Opinion for International Application No. PCT/US2010/035795 mailed Oct. 13, 2011, 14 pages.

International Search Report and Written Opinion for International Application No. PCT/US2010/062016 mailed Jan. 19, 2012, 7 pages.

International Search Report and Written Opinion for International Application No. PCT/US2010/062010, mailed Apr. 13, 2011, 14 pages.

Moore, J. J. et al., "Conceptual Design Study of Hydraulic Compression for Wind Turbine Driven Air Compression," Final Report, SwRI Project No. 18.18094.01.016, Jun. 6, 2008, Southwest Research institute, 50 pages.

Sanderson, A. E., "Hydraulic System for Control of Power Windmills," undated, 11 pages.

Sanderson Engine Development, "Application of Sanderson Mechanism for Conversion Between Linear and Rotary Motion," [online], [retrieved on May 8, 2008]. Retrieved from the Internet: <URL: http://www.sandersonengine.com/html/projects.html>, 2 pages.

Simetric, "Mass, Weight, Density or Specific Gravity of Liquids," [online], [retrieved on Jan. 2, 2008]. Retrieved from the Internet: <URL: http://www.simetric.co.uklsi liquids.htm>, 5 pages.

"Swash-plate Type Axial Piston Pumps for Open Circuits in General Industrial Machinery," Kawasaki K3VG, Kawasaki Motor Corp., USA, 2006, 24 pages.

\* cited by examiner

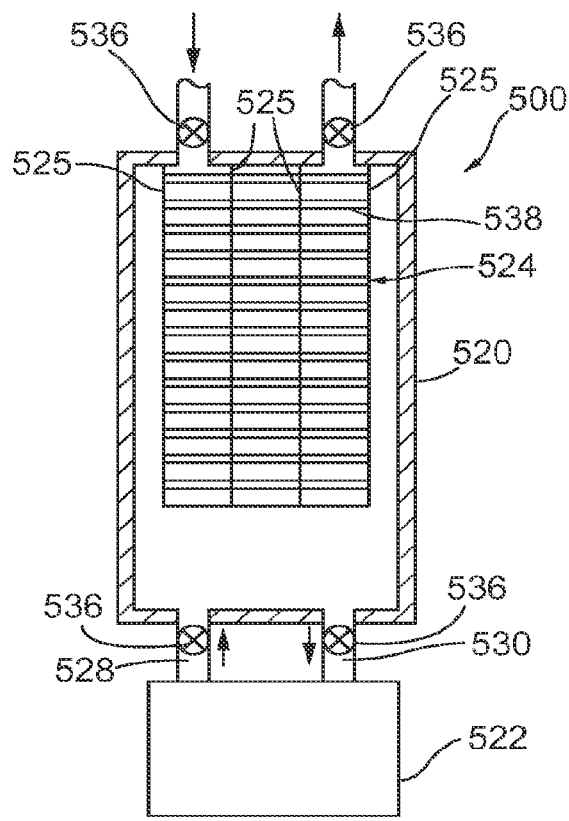
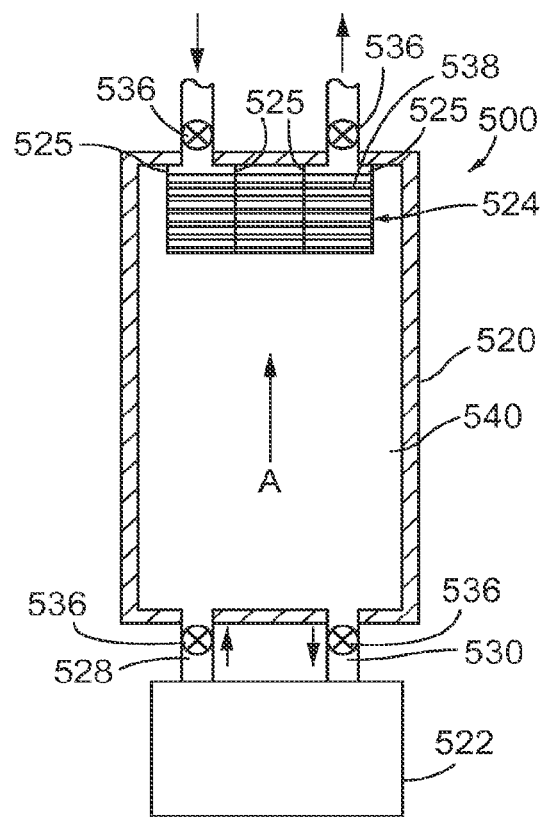
FIG. 5A
FIG. 5B

1

METHODS AND DEVICES FOR OPTIMIZING HEAT TRANSFER WITHIN A COMPRESSION AND/OR EXPANSION DEVICE

CROSS REFERENCE TO RELATED APPLICATIONS

This application is a continuation of U.S. patent application Ser. No. 12/977,679, filed Dec. 23, 2010, entitled "Methods and Devices for Optimizing Heat Transfer within a Compression and/or Expansion Device," which is a continuation-in-part of U.S. patent application Ser. No. 12/785,086, filed May 21, 2010, entitled "Compressor and/or Expander Device", which claims priority to and the benefit of U.S. Provisional Patent Application Ser. No. 61/216,942, filed May 22, 2009, entitled "Compressor and/or Expander Device", and also claims priority to and the benefit of U.S. Provisional Patent Application Ser. No. 61/290,107, filed Dec. 24, 2009, entitled "System and Methods for Optimizing Efficiency of a Hydraulically Actuated System," the disclosures of which are hereby incorporated by reference in their entirety.

BACKGROUND

The invention relates generally to systems, devices and methods for the compression and/or expansion of a gas, such as air, and particularly to a system, device and method for optimizing heat transfer during the compression and/or expansion of a gas.

Some known devices, methods and systems used to compress and/or expand a gas, such as air, and/or to pressurize and/or pump a liquid, such as water, can be used, for example, within a compressed air energy storage system. In some compressed air devices and systems, a hydraulic actuator can be used to move or compress air within a pressure vessel. For example, an actuator can move a liquid within a pressure vessel such that the liquid compresses air in the pressure vessel.

Such known devices and systems used to compress and/or expand a gas and/or to pressurize and/or pump a liquid can change the temperature of the gas during, for example, a compression or expansion process. For example, compressing a gas can convert heat energy from its latent form into its sensible form, thereby increasing the temperature of the gas. Various heat transfer mechanisms can be used to remove heat energy during the compression process from the gas being compressed. In some known devices and systems, heat energy in the gas being compressed within a pressure vessel can also be transferred to the liquid used to compress the gas.

Thus, there is a need to improve and/or optimize the heat transfer devices and methods used to transfer heat during a compression and/or expansion process between the gas and the liquid within such devices and systems used to compress and/or expand a gas.

SUMMARY OF THE INVENTION

Systems, methods and devices for optimizing heat transfer within a device or system used to compress and/or expand a gas, such as air, are described herein. In some embodiments, a compressed air device and/or system can include an actuator such as a hydraulic actuator that can be used to compress a gas within a pressure vessel. An actuator can be actuated to move a liquid into a pressure vessel such that the liquid compresses gas within the cylinder or pressure vessel. In such a compressor/expander device or system, during the compression and/or expansion process, heat can be transferred to the liquid used to compress the air. The compressor and/or expander process can include a heat transfer element that can be used to transfer heat energy between the gas and the liquid during a compression and/or expansion process.

BRIEF DESCRIPTION OF THE DRAWINGS

FIG. 5A is a side view shown partially in cross-section of a portion of a compression and/or expansion device, according to another embodiment and shown in a first configuration.

FIG. 5B is a side a side view shown partially in cross-section of the portion of a compression and/or expansion device of FIG. 5A, shown in a second configuration.

DETAILED DESCRIPTION

Figure 1:
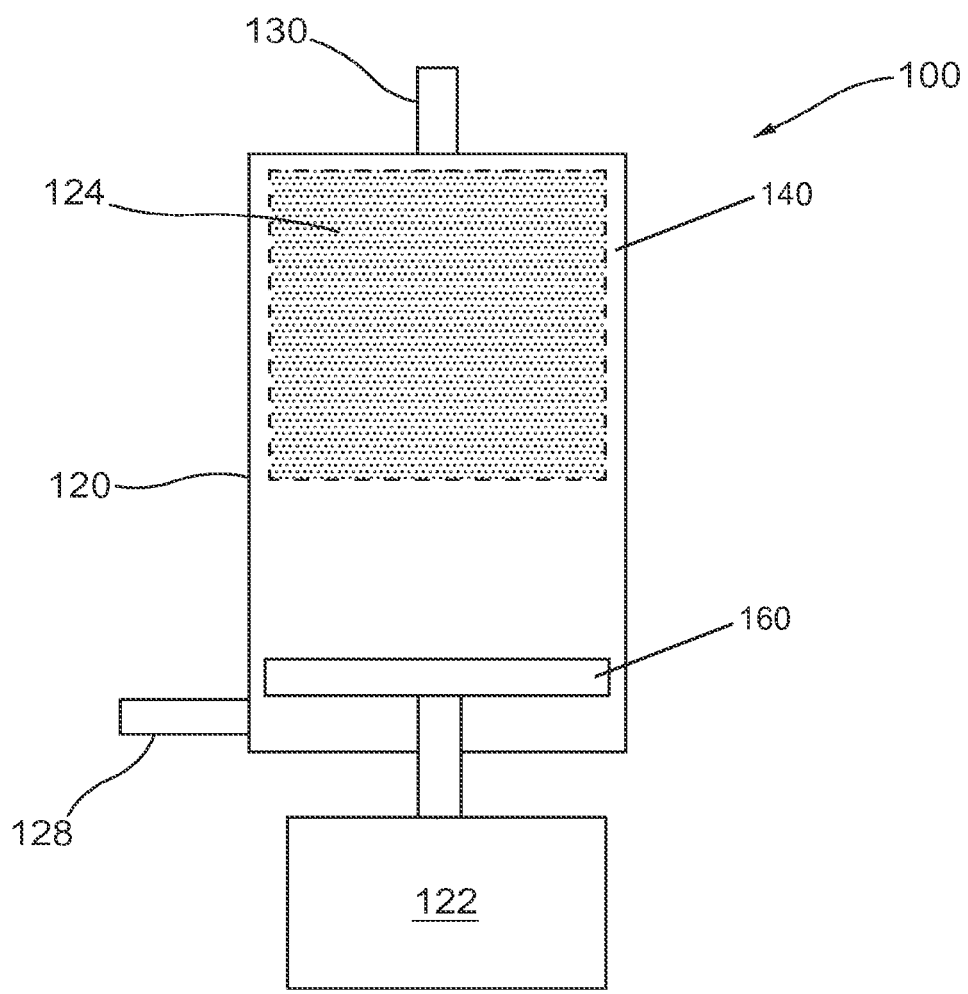
FIG. 1 is a schematic illustration of a compression and/or expansion system according to an embodiment.

Systems, methods and devices used to compress and/or expand a gas, such as air, and/or to pressurize and/or pump a liquid, such as water, are described herein. Such devices and systems can be used, for example, within a compressed air energy storage (CAES) system. In some compression and/or expansion devices and systems, a hydraulic actuator can be used to move or compress a gas within a pressure vessel. For example, an actuator can move a liquid within a pressure vessel such that the liquid compresses the gas in the pressure vessel. Such compression devices and systems are described in U.S. patent application Ser. No. 12/785,086; U.S. patent application Ser. No. 12/785,093; and U.S. patent application Ser. No. 12/785,100, each titled "Compressor and/or Expander Device" (collectively referred to as "the Compressor and/or Expander Device applications"), incorporated herein by reference in their entirety. The Compressor and/or Expander Device applications describe a CAES system that can include multiple stages of compression and/or expansion. Other examples of devices and systems for expanding and/or compressing as gas are described in U.S. Provisional Patent App. No. 61/290,107, to Aborn et. al. ("the Aborn application"), entitled "System and Methods for Optimizing efficiency of a Hydraulically Actuated System," the disclosure of which is incorporated herein by reference in its entirety.

In some compression and/or expansion devices and systems, a piston can be movably disposed within a cylinder or pressure vessel and actuated to compress air within the cylinder or pressure vessel. Such a device can include a single-acting piston configured to compress gas when moved in a single direction, or a double-acting piston configured to compress gas when moved in either direction. Examples of such compressed air devices and systems are described in U.S. Patent App. No. 61/420,505, to Ingersoll et. al. ("the Ingersoll application"), entitled "Compressor and/or Expander Device with Rolling Piston Seal," the disclosure of which is incorporated herein by reference in its entirety.

In some embodiments, the devices and systems described herein can be configured for use only as a compressor. For example, in some embodiments, a compressor device described herein can be used as a compressor in a natural gas pipeline, a natural gas storage compressor, or any other industrial application that requires compression of a gas. In another example, a compressor device described herein can be used for compressing carbon dioxide. For example, carbon dioxide can be compressed in a process for use in enhanced oil recovery or for use in carbon sequestration.

In some embodiments, the devices and systems described herein can be configured for use only as an expansion device. For example, an expansion device as described herein can be used to generate electricity. In some embodiments, an expansion device as described herein can be used in a natural gas transmission and distribution system. For example, at the intersection of a high pressure (e.g., 500 psi) transmission system and a low pressure (e.g., 50 psi) distribution system, energy can be released where the pressure is stepped down from the high pressure to a low pressure. An expansion device as described herein can use the pressure drop to generate electricity. In other embodiments, an expansion device as described herein can be used in other gas systems to harness the energy from high to low pressure regulation.

In some embodiments, a compression and/or expansion device as described herein can be used in an air separation unit. In one example application, in an air separator, a compression and/or expansion device can be used in a process to liquefy a gas. For example, air can be compressed until it liquefies and the various constituents of the air can be separated based on their differing boiling points. In another example application, a compression and/or expansion device can be used in an air separator co-located with in a steel mill where oxygen separated from the other components of air is added to a blast furnace to increase the burn temperature.

A compression and/or expansion system can have a variety of different configurations and can include one or more actuators that are used to compress/expand a gas (e.g. air) within a compression/expansion device. In some embodiments, an actuator can include one or more pump systems, such as for example, one or more hydraulic pumps and/or one or more pneumatic pumps that can be use to move one or more fluids within the system between various water pumps and pressure vessels. As used herein, "fluid" can mean a liquid, gas, vapor, suspension, aerosol, or any combination thereof. The Compressor and/or Expander Device applications incorporated by reference above describe various energy compression and expansion systems in which the systems and methods described herein can be employed.

As described herein, devices and systems used to compress and/or expand a gas, such as air, and/or to pressurize and/or pump a liquid, such as water, can release and/or absorb heat during, for example, a compression process. The devices and systems described herein can include one or more heat transfer mechanisms to remove heat during the compression process. In some embodiments, a heat transfer element can be used as described, for example, in the Compressor and/or Expander Device applications and/or the Ingersoll application incorporated herein. During an expansion process in a CAES system, when compressed air is released from a storage structure and expanded through the compressor/expander system, heat from a source can be added to the air to increase the power generated during the expansion process. In some embodiments, the source of heat can be at a relatively low temperature (e.g., between for example, about 10° C. and about 50° C.).

In some embodiments, a heat transfer element can be positioned within the interior of a pressure vessel of a compressor/expander device to increase the amount of surface area within the pressure vessel that is in direct or indirect contact with gas, which can improve heat transfer. The heat transfer element may be configured to minimize the distance that heat must travel through the air in order to reach the heat transfer element, such as a maximum distance of ⅛ of an inch, and other distances. The heat transfer element can provide for an increased heat transfer area both with gas that is being compressed and with gas that is being expanded (through a gas/liquid interface area and/or gas/heat transfer element interface), while allowing the exterior structure and overall shape and size of a pressure vessel to be optimized for other considerations, such as pressure limits and/or shipping size limitations. In some embodiments, the heat transfer element can be a thermal capacitor that absorbs and holds heat released from a gas that is being compressed, and then releases the heat to a gas or a liquid at a later time. In some embodiments, the heat transfer element can be a heat transferring device that absorbs heat from a gas that is being compressed, and then facilitates the transfer of the heat outside of the pressure vessel.

In some embodiments, heat energy can be removed from a gas during compression via a liquid that is present in one or more pressure vessels of a compressor/expander device to maintain the gas that is being compressed at a relatively constant temperature. The heat energy can be transferred from the gas to the liquid and/or the compressor and/or expander device to a heat transfer element disposed within the pressure vessel. After gas is provided to the compressor/expander device, heat energy is removed from the gas, i.e. the gas is kept cooler as it is compressed than would be the case without the heat transfer element, and may be done to an extent that the temperature of the gas remains relatively constant. The temperature of the gas can be maintained, for example, at about 5° C., 10° C., 20° C., 30° C. or other temperatures that may be desirable, until discharged to, for example, a compressed gas storage structure or a subsequent compression stage. The gas stored in the storage structure may be heated (or cooled) naturally through conductive and/or convective heat transfer if the storage structure is naturally at a higher (or lower) temperature. For example, in some cases, the storage structure may be an underground structure, such as a salt cavern constructed in a salt dome that are used for storing the compressed gas. In some embodiments, the heat transfer element can be designed such that the temperature of the gas does not remain relatively constant, but instead increases a relatively small amount, for example, 5° C., 10° C., 20° C., 30° C.

As discussed above, heat may be added to the gas during an expansion process. For example, heat can be added to the gas at some or all of the stages of a multi-stage compression/expansion system to hold gas temperatures at a substantially constant temperature, such as at about 35° C., or other temperatures, during the entire expansion process. The overall temperature change of gas during expansion may be limited by contact with substantial heat transfer surfaces, e.g. a heat transfer element.

As discussed above, heat can be transferred from and/or to gas that is compressed and/or expanded by liquid (e.g., water) within a pressure vessel. A gas/liquid or gas/heat element interface may move and/or change shape during a compression and/or expansion process in a pressure vessel. This movement and/or shape change may provide a compressor/expander device with a heat transfer surface that can accommodate the changing shape of the internal areas of a pressure vessel in which compression and/or expansion occurs. In some embodiments, the liquid may allow the volume of gas remaining in a pressure vessel after compression to be nearly eliminated or completely eliminated (i.e., zero clearance volume).

A liquid (such as water) can have a relatively high thermal capacity as compared to a gas (such as air) such that a transfer of an amount of heat energy from the gas to the liquid avoids a significant increase in the temperature of the gas, but only incurs a modest increase in the temperature of the liquid. This allows buffering of the system from substantial temperature changes. Said another way, this relationship creates a system that is resistant to substantial temperature changes. Heat that is transferred between the gas and liquid, or components of the vessel itself, may be moved from or to the pressure vessel through one or more processes. In some embodiments, heat can be moved in or out of the pressure vessel using mass transfer of the compression liquid itself. In other embodiments, heat can be moved in or out of the pressure vessel using heat exchange methods that transfer heat in or out of the compression liquid without removing the compression liquid from the pressure vessel. Such heat exchangers can be in thermal contact with the compression liquid, components of the pressure vessel, a heat transfer element, or any combination thereof. Furthermore, heat exchangers may also use mass transfer to move heat in or out of the pressure vessel. One type of heat exchanger that can be used to accomplish this heat transfer is a heat pipe as described in the Compressor and/or Expander Device applications and the Aborn application incorporated by reference above. Thus, the liquid within a pressure vessel can be used to transfer heat from gas that is compressed (or to gas that is expanded) and can also act in combination with a heat exchanger to transfer heat to an external environment (or from an external environment).

In some embodiments, heat can be transferred from a gas (such as air) that is compressed in a pressure vessel to increase the efficiency of the compression process. Heat can be transferred from the gas to a liquid, and/or from the gas to a heat transfer element within the compression vessel, and/or from the compression liquid while it is inside or outside of the pressure vessel. The amount of heat transferred from an amount of gas being compressed depends on the rate of heat transfer from the gas and on the time over which the heat transfer takes place, i.e. over the cycle time during which the gas compression takes place. Thus, for a given rate of heat transfer that can be achieved by a system, the more slowly the system is operated (i.e., the longer the compression cycle times), the more closely the compression cycle can approach isothermal compression. However, slower compression cycle times also correlate to lower gas volumetric and/or mass flow rates. In the context of a CAES system, this equates to lower energy storage rates, equivalently known as lower power. Conversely, in a gas expansion process, the more slowly the system is operated, the more heat energy can be transferred to the expanding gas (for a given heat transfer rate) and the more closely the more closely the expansion cycle can approach isothermal expansion, which may correspond to more efficient consumption of air mass relative to energy extracted/converted. However, in the context of a CAES system, the resulting lower expanding gas flow rate may equate to lower power production.

The use of a liquid (e.g. water) as a medium through which heat passes (directly through contact between the gas and liquid, or indirectly through an intermediary material) during compression and/or expansion may allow for continuous cooling or heating at enhanced heat transfer rates and may provide a mechanism by which heat may be moved in and/or out of the pressure vessel. That is, during compression the liquid may receive heat from gas that is being compressed, and transfer this heat from the pressure vessel to the external environment continuously, both while gas is being compressed and while gas is being received by the pressure vessel for later compression. Similarly, heat addition may occur when a compressor/expander device is operating in an expansion mode both during expansion and as expanded gas is passed from the pressure vessel.

In some embodiments, a heat transfer element can be provided within a pressure vessel that can provide sufficient gas/liquid interface and sufficient thermal capacity to efficiently intermediate in the transfer of heat from the compressed gas into the liquid. A heat transfer element can be a variety of different configurations, shapes, sizes, structures, etc. to provide a relatively high surface area per unit volume or mass with the air as it is being compressed and/or at an end of the stroke of a compression cycle. The heat transfer element can be formed from one or more of a variety of different materials that provide a relatively high volumetric specific heat as compared to air. The combined effects of density, volume and specific heat, and how these parameters behave per unit volume, can contribute to the absorption performance of a particular heat transfer element. For example, both water and various metals provide a relatively high volumetric specific heat as compared to air, particularly at atmospheric air density. Thus, when the metal or water absorbs the heat from the air as it is being compressed, the air and/or water temperature increases only moderately.

For example, the mass specific heat values for air, water and stainless steel (one example metal that can be used) can be as follows:

air: 1,005 J/kg-K;
water: 4,183 J/kg-K; and
stainless steel: 502 J/kg-K.

The above values are only one example of the mass specific heat values for air, water and stainless steel, as specific heat of a particular material can depend on other factors such, as, for example, the temperature of the material. The heat absorbing capability per unit volume of the material is a factor of both a material's density and the mass specific heat of the material. The density of material can also depend on the temperature of the material. An example of possible material densities for air, water and stainless steel are as follows:

air: 1.2 $kg/m^3$ (at sea level pressure and 20° C.);
water: 998 $kg/m^3$; and
stainless steel: 8,027 $kg/m^3$.

By combining the mass specific heat and density, the heat absorbing performance per unit volume (which may also be referred to as heat capacity) for air, water and stainless steel can be determined as follows:

air: 1,005 J/kg-K×1.2 $kg/m^3$=1,206 $J/m^3$-K (at sea level pressure and 20° C.);
water: 4,183×998 $kg/m^3$=4,174,634 $J/m^3$-K; and
stainless steel: 502 J/kg-K×8,027 $kg/m^3$=4,029,554 $J/m^3$-K.

In the above example, the air has a relatively small volumetric specific heat relative to both water and stainless steel. The high heat absorbing performance of an air-to-metal interface can provide a compressor/expansion device that uses metal as an intermediate absorption mechanism (between the air and the water) to a greater extent than the direct air-to-water absorption mechanism.

It should be understood that the calculation of heat absorbing performance (e.g., heat capacity) discussed above is merely one example, as the density and specific heat values of air, water and stainless steel, can vary depending on other factors, such as, for example, temperature, pressure and grade of material. For example, the density of air, and thus its heat capacity, scales approximately linearly with pressure (at a given temperature), so that the values above are higher by a factor of 10 at a pressure of 10 bar, and a factor of 100 at a pressure of 100 bar. Similarly, the density and heat capacity of air scale approximately linearly, but inversely, with temperature (at a given pressure). Thus, the values of density and heat capacity of air at 586K (313° C.) are approximately half of the values at 293K (20° C.). However, even at the higher end of the range of air pressures that can be produced by a compressor/expander device as described herein, the heat capacity of air is one or two orders of magnitude lower than water or stainless steel. In addition, other materials can be used for the heat transfer element, such as, for example, tungsten and titanium. Tungsten can have, for example, a density of 19,300 $kg/m^3$ and a specific heat of 132 J/kg-K to provide a heat absorbing performance per unit volume of 2,548,000 $J/m^3$-K. Titanium can have for example, a density of 4,510 $kg/m^3$ and a specific heat of 520 J/kg-K to provide a heat absorbing performance per unit volume (or heat capacity) of 2,345,200 $J/m^3$-K. As with stainless steel, the density and specific gravity can vary depending on, for example, the temperature, pressure and particular grade of the material.

In an embodiment that uses a metal heat transfer element, the heat absorbed by the metal can be transferred to the liquid (e.g., water) in the system, which as described previously can be transferred out of the pressure vessel by other methods such as a heat exchanger (e.g., heat pipes or other mechanisms).

FIG. 1 schematically illustrates a portion of a compression and/or expansion device (also referred to herein as "compression/expansion device") according to an embodiment. A compression/expansion device 100 can include one or more pressure vessels 120 (also referred to herein as "cylinder") having a working chamber 140, an actuator 122 by which the volume of working chamber 140, and/or the portion of the volume of the working chamber 140 that can be occupied by gas, can be changed (decreased to compress the gas, increased to expand the gas), and one or more heat transfer elements 124 disposed within the working chamber 140. The compression/expansion device 100 can be used, for example, to compress or expand a gas, such as air, within the working chamber 140. The compression/expansion device 100 can be used, for example, in a CAES system.

The pressure vessel 120 can include one or more gas inlet/outlet conduits 130 in fluid communication with the working chamber 140. Optionally, the pressure vessel 120 can include one or more liquid inlet/outlet conduits 128 in fluid communication with the working chamber 140. The working chamber 140 can contain at various time periods during a compression and/or expansion cycle, a quantity of gas (e.g., air) that can be communicated to and from working chamber 140 via the inlet/outlet conduits 130, and optionally can also contain a quantity of liquid (e.g., water) that can be communicated to and from working chamber 140 via the inlet/outlet conduits 128. The compression/expansion device 100 can also include multiple valves (not shown in FIG. 1) coupled to the inlet/outlet conduits 128, 130 and/or to the pressure vessel 120. The valves can be configured to operatively open and close the fluid communication to and from the working chamber 140. Examples of use of such valves are described in more detail in the Compressor and/or Expander Device applications incorporated by reference above.

The actuator 122 can be any suitable mechanism for selectively changing the volume of the working chamber 140 and/or the portion of the volume of the working chamber that can be occupied by gas. For example, the working chamber 140 can be defined by a cylinder and the face of a piston 160 disposed for reciprocal movement within the cylinder. Movement of the piston 160 in one direction would reduce the volume of the working chamber 140, thus compressing gas contained in the working chamber 140, while movement of the piston 160 in the other direction would increase the volume of the working chamber 140, thus expanding gas contained in the working chamber 140. The actuator 122 can thus be the piston 160 and a suitable device for moving the piston 160 within the cylinder, such as a pneumatic or hydraulic actuator such as, for example, the hydraulic actuators described in the Aborn application incorporated by reference above.

In some embodiments, the working chamber can have a fixed volume, i.e. a volume defined by a chamber with fixed boundaries, and the portion of the volume of the working chamber 140 that can be occupied by gas can be changed by introducing a liquid into, or removing a liquid from, the working chamber 140. Thus, the working chamber 140 has a volume with a first portion containing a volume of liquid, and a second portion that can contain gas, which volume is the total volume of the working chamber 140 less the volume of the first portion (the volume of the liquid). In such embodiments, the actuator 122 can be any suitable device for introducing liquid into, or removing liquid from, the working chamber, such as a hydraulic actuator that can move a liquid in and out of the working chamber 140 via liquid inlet/outlet conduit 128. In such an embodiment, the actuator 122 can include a water pump (not shown) that drives a hydraulically driven piston (not shown) disposed within a housing (not shown) and can be driven with one or more hydraulic pumps (not shown) to move a volume of liquid in and out of the working chamber 140. An example of such a hydraulic actuator is described in the Compressor and/or Expander Device applications incorporated by reference above.

In some embodiments, the working chamber can be configured to combine the techniques described above, i.e. the working chamber can have a variable volume, e.g. using a cylinder and piston as described above, and the portion of the variable volume that can be occupied by gas can be changed by introducing liquid into, or removing a liquid from, the working chamber. In another embodiment, a constant volume of liquid can be maintained in the variable volume working chamber throughout all, or a portion, of the compression cycle.

The heat transfer element 124 can be a variety of different configurations, shapes, sizes, structures, etc. to provide a relatively high surface area per unit volume or mass that can be in contact with the gas (e.g., air) as it is being compressed or expanded within the working chamber 140. In some embodiments, it may be desirable to include a heat transfer element 124 that can be formed with a material that can provide high thermal conductivity in a transverse and a longitudinal direction within the working chamber 140. The heat transfer element 124 can be formed from one or more of a variety of different materials. For example, the heat transfer element 124 can be formed with metals (e.g. stainless steel), metal wires, hybrid wires, carbon fiber, nano-materials, and composite materials (e.g. carbon polymer compounds) which have anti-corrosion properties, are lighter weight, and are less expensive than some metallic materials.

The heat transfer element 124 can be disposed at various locations within the working chamber 140 so as to optimize the heat transfer within the pressure vessel 120. For example, in some embodiments, the heat transfer element 124 can be disposed within the working chamber 140 near an end portion of the working chamber 140 in a portion occupied by the gas (e.g., air) near the end of a compression cycle. As the gas is compressed during the compression cycle, the work done on the gas adds heat energy to the gas. The heat energy is continuously transferred (primarily by conductive and/or convective, rather than radiant, heat transfer) to the heat transfer element 124. This transfer maintains the gas temperature at a lower value than would be the case without the heat transfer element 124, and moderately increases the temperature of the heat transfer element 124.

As described above, in some embodiments, the working chamber 140 can contain a liquid, and/or the actuator 122 can be used to change the portion of the working chamber 140 that is available to contain gas, by moving a liquid, such as water, into and out of the working chamber, such that gas, such as air, within the working chamber 140 is compressed by the liquid. In such embodiments, depending on the rate at which the working chamber 140 is filled with liquid, and the heat transfer properties of the heat transfer element 124, the gas and the heat transfer element 124 will be relatively closer or farther from thermal equilibrium, and thus, during some or all of the compression cycle, the liquid in the working chamber 140 can be caused to contact the heat transfer element 124 to receive from the heat transfer element 124 heat energy it received from the compressed gas. Optionally, at the end of the compression cycle, any pressurized gas remaining in the working chamber 140 can be released from the working chamber 140, and transferred to the next step or stage in the compression process or to a storage facility. Liquid can then be moved into the working chamber 140, to substantially fill the volume occupied by gas that was released from the working chamber 140 after compression (which volume is now filled with gas at a lower pressure) by introducing more liquid and/or by reducing the volume of the working chamber (e.g. by moving a piston). The heat energy stored in the heat transfer element 124 can then be transferred (again, by conductive and/or convective transfer) to the water in the working chamber 140.

In some embodiments, the heat transfer element 124 can be disposed within a substantial portion of the working chamber 140 such that air and water can flow through, along, and/or across the heat transfer element 124 as the liquid fills an increasingly larger portion of the volume of the working chamber 140 and compresses the air within the working chamber 140. In such an embodiment, the heat transfer element 124 can be in contact with both air and water from the beginning of the compression cycle, with progressively less being exposed to air, and more being exposed to water, as the cycle progresses.

In some embodiments, the heat transfer element 124 can have a density that varies spatially within the heat transfer element, so that the heat transfer can be tailored. For example, in some embodiments, the heat transfer element 124 can be disposed within a substantial portion of the pressure vessel 120 as described above, and have a density that varies from the bottom to the top of the heat transfer element 124. For example, the density of the heat transfer element 124 can increase as the air moves from the beginning of the compression cycle to the end of the compression cycle. In other words, the heat transfer element 124 is more dense where the air is disposed near the end of the compression cycle than where the air is disposed at the beginning of the compression cycle. The density can be varied by varying the composition of the heat transfer element (i.e. using materials of different density) and/or by varying the amount of heat transfer material per unit volume (e.g. by more closely packing discrete components of the heat transfer element, such as rods, tubes, filaments, etc.).

In some embodiments, the heat transfer element 124 can be designed to maximize the amount of gas in the working chamber 140 to be compressed. Thus, increasing the mass of gas that can be compressed for any given size of pressure vessel 120 increases the power density of that device. As the density (e.g., the amount of heat transfer material per unit volume) of the heat transfer element 124 increases, the remaining volume in the working chamber 140 available for a mass of gas to be compressed decreases. Although the increased density of heat transfer element 124 improves the transfer of heat energy from the gas being compressed to the heat transfer element 124, the volume of gas being compressed with each compression cycle is reduced. Said another way, volume of the working chamber 140 occupied by the heat transfer element 124 directly reduces the mass of gas that can be compressed with any given pressure vessel 120. Furthermore, reducing the size of the heat transfer element 124 can reduce the capital equipment costs (e.g. by savings on materials) and operating costs (e.g. decreasing the overall weight of the equipment being moved by the actuator. Thus, in some embodiments, the heat transfer element 124 can be designed such that the heat transfer element has sufficient surface area to remove the heat energy generated by the compression of the gas, while minimizing the volume of the working chamber 140 occupied by the heat transfer element 124 to maximize the volume in the working chamber 140 for gas to be compressed. In some embodiments, multiple transfer elements 124 can be movable with respect to each other such that the density of the heat transfer element 124 in a given portion of the working chamber 140 can be varied throughout a compression/expansion cycle to maximize heat transfer surface area and minimize heat transfer element volume 124.

In some embodiments, the working chamber 140 can be partially filled with a liquid (e.g. water) that can be communicated to and from the working chamber 140 via the inlet conduit 128 and the outlet conduit 130, respectively, or via other conduits (not shown). During the compression cycle, heat energy generated during the compression process can be transferred from the gas, to the heat transfer element 124, and then to the liquid. A volume of the heated liquid can then be discharged from the pressure vessel 120 via the outlet conduit 130 or via a separate liquid discharge conduit (not shown). As described above with respect to the heat transfer element 124, the volume of liquid that occupies a portion of working chamber 140 reduces the remaining volume of the working chamber 140 available for a mass of gas to be compressed. In other words, although the liquid in the working chamber 140 provides a mechanism by which the heat energy generated by the compression of the gas can be removed from the pressure vessel 120 (i.e. by first quenching the heat transfer element 124 to transfer the heat energy to the liquid, and then discharging the heated liquid out of the pressure vessel 120), both the liquid and the heat transfer element occupy a portion of the working chamber 140, thereby reducing the mass of gas that can be compressed. In some embodiments, the heat transfer element and the volume of liquid in the working chamber 140 can be designed to remove a sufficient amount of heat energy generated during the compression process, while maximizing the amount of gas in the working chamber 140 to be compressed. For example, having multiple heat transfer elements 124 that are movable with respect to each other such that the density of the heat transfer element 124 disposed in the portion of the working chamber containing gas can be varied throughout a compression cycle can reduce the volume of liquid for quenching the heat transfer element 124.

In some embodiments, more than one heat transfer element 124 can be used. For example, in such an embodiment, more than one of the same type of heat transfer element 124 can be used, or a combination of different types or configurations of heat transfer elements 124 can be used. In addition, within a given compression/expansion device 100, one or more of the same or different combinations of heat transfer elements 124 can be used in one or more of the working chambers 140 of that system. In some embodiments, one or more heat transfer elements 124 can be positioned within the working chamber 140 such that the density of the heat transfer elements is varied within the pressure vessel 120.

In some embodiments, the heat transfer element 124 can include multiple tubular members arranged concentrically within each other. The concentric tubular members can be placed within the interior of the working chamber 140 in a vertical orientation (i.e. an orientation approximately perpendicular to the surface of liquid contained in the working chamber 140) such that air can flow through the annular spaces created by the concentric tubular members as it is moved through the working chamber 140 during a compression cycle. In some embodiments, the concentric tubular members may have a varying diameter along their length. For example, the concentric tubular members can have a tapered shape, an hourglass shape, or some other suitable shape.

In some embodiments, the heat transfer element 124 can include multiple elongate members (which may be solid and/or tubular) arranged in a bundle and oriented in a vertical orientation within the working chamber 140. As air flows through the pressure vessel 120 during a compression cycle, the air can flow in between or through the elongate members (e.g., if tubular elongate members). In some embodiments, the tubular elongate members and/or solid elongate members may have a varying diameter along there length. For example, the tubular members or elongate members can have a tapered shape, an hourglass shape, or some other suitable shape. In some embodiments, the bundle of elongate members can be optimized for spacing between the elongate members, and which can vary, for example, along a length or height of the elongate members.

In some embodiments, the heat transfer element 124 can include tessellating metal plates or a stack of metal plates. The plates can be, for example, planar or curved, porous plates, or mesh screens. In some embodiments, the plates can slide with respect to each other, thereby modifying the heat transfer surface area per unit volume of air as the stroke progresses. Such an embodiment of a heat transfer element 124 based on tessellating plates may be valuable for implementing a smaller or more compact pressure vessel 120. For example, during a compression stroke that reduces the gas volume in which the heat transfer element 124 is disposed, the heat transfer element 124 may by tessellation pack into a volumetrically compact form. This packing may be designed to occur in concert with the compression stroke. During an expansion stroke, the heat transfer element 124 may unpack and thereby volumetrically expand in concert with the expansion stroke. The plates may be moved or displaced by the engagement with a moving boundary of the working chamber 140, e.g. a piston face, and/or by liquid contained within the working chamber 140 (e.g. if the plates are buoyant), and/or by an actuator.

In some embodiments the heat transfer element 124 can include one or more metal coils. For example, the heat transfer element 124 can include structures in the form of stacking coils, conical spiraling coils, or flexible helical coils similar to a Slinky®. Such an embodiment can have an effect that is similar to the tessellating plate embodiment described above in that relative motion between various locations on the coil allows the heat transfer element 124 to grow or shrink in axial dimension through the cycle (e.g., compression or expansion cycle), providing the same heat transfer surface area as a rigid design within a smaller enclosed volume while accommodating a change in the corresponding dimension of the working chamber 140 (e.g. with movement of a piston bounding one end of the working chamber 140).

In some embodiments, the heat transfer element 124 can include one or more fabric elements and/or one or more fiber elements and/or structures that can absorb liquid similar to a mop or sponge. Such a heat transfer element 124 can be used, for example, in embodiments in which liquid is contained in the working chamber (e.g. in which the portion of the volume of the working chamber 140 available to be occupied by gas can be changed by introducing liquid into, or removing liquid from, the working chamber 140). The heat transfer element can wick liquid along its length into contact with air in the working chamber, and/or once wetted by direct contact with the liquid can retain the liquid on its surface, e.g. in the form of a film or droplets. In such an embodiment of a heat transfer element 124, the liquid on the heat transfer element provides a gas-to-liquid interface that can facilitate heat transfer can to the fabric and/or fiber elements.

In some embodiments, the heat transfer element 124 can implement a three dimensional net structure of fiber-form material. Such fibers may hold liquid, or liquid droplets, in a spatially distributed pattern that may create an air-to-liquid geometry that beneficially facilitates the ready flow of heat energy between the air and the liquid. The fibers may also include surface treatments and/or surface coatings (e.g. of hydrophilic materials) that enhance the liquid adhesion behavior of the fiber structure. In some such embodiments, a three dimensional fiber network can bring air into intimate contact with the process liquid at all, or substantially all, locations within the working chamber 140, rather than just at the interface of the liquid and the air (i.e. the liquid's surface). In this manner, heat transfer can occur directly from the air into the process liquid (e.g. water).

In some embodiments, the heat transfer element 124 can be stationary in that it remains substantially in a fixed position within the working chamber 140 during a compression cycle. In some embodiments, the heat transfer element 124 can be movable or dynamic in that it can move within the working chamber 140 during a compression and/or expansion cycle. In some embodiments, the heat transfer element 124 can collapse and expand within the working chamber 140. For example a stack of metal coils or stack of tessellating plates described above can be configured to collapse and expand within the working chamber 140. In some embodiments that include a compression and expansion device using a piston to change the volume of the working chamber 140, a heat transfer element 124 can move with the stroke of the piston, e.g. by engagement with the face of the piston. In some embodiments, the heat transfer element 124 can move (e.g., collapse and expand) in a longitudinal direction and/or vertical direction. In some embodiments, the heat transfer element 124 can move (e.g., collapse and expand) in a radial direction.

Heat energy transferred from the gas to the heat transfer element 124 can in turn be transferred out of the pressure vessel 120 by any suitable means, include a heat pipe, circulating fluid, etc., to a location where it can be dissipated, used in other processes, and/or stored for future use in the compression/expansion device (e.g. in an expansion cycle). In addition, or alternatively, heat energy transferred from the gas to the heat transfer element 124 can be transferred from the heat transfer element 124 to fluid contained in the working chamber 140. The heat energy can then be transferred from the fluid out of the pressure vessel. Similar techniques can be used to transfer heat energy from outside the pressure vessel to the heat transfer element 124 and thence to the gas in the working chamber, e.g. during an expansion cycle.

Figure 2A:
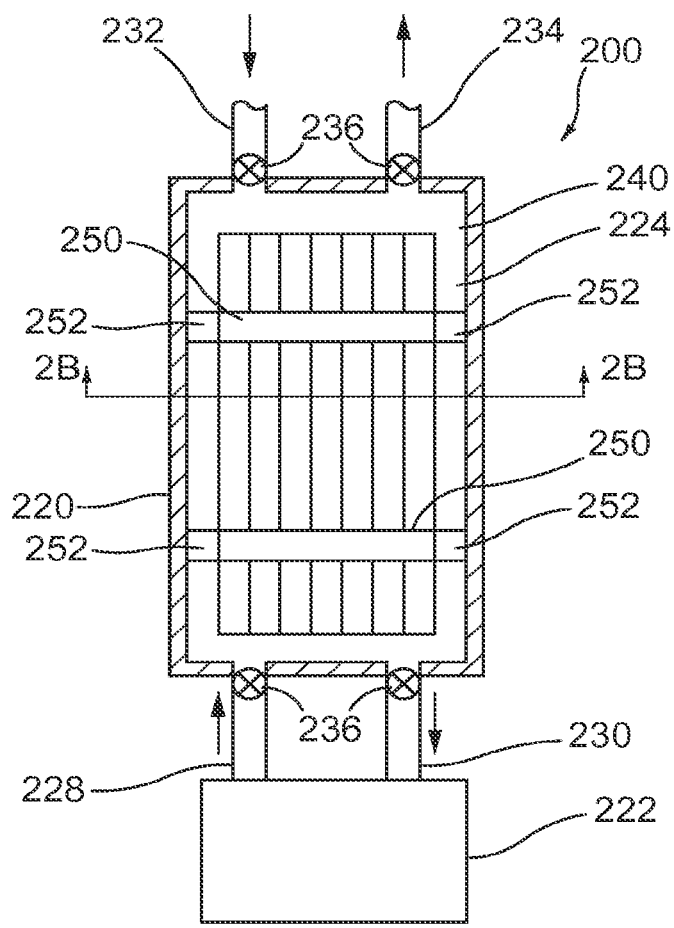
FIG. 2A is a side view shown partially in cross-section of a portion of a compression and/or expansion device, according to an embodiment.
Figure 2B:
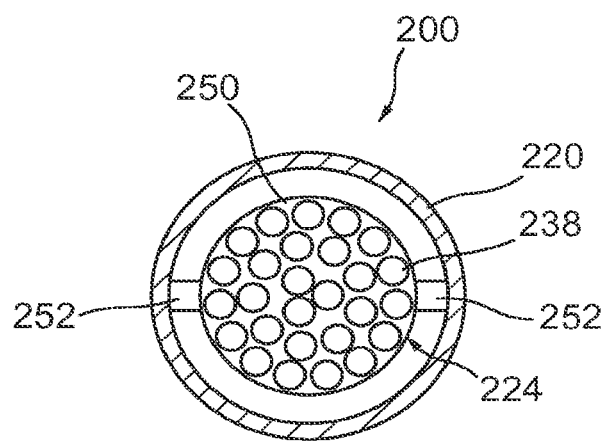
FIG. 2B is a cross-sectional view of the compression and/or expansion device of FIG. 2A, taken along line 2B-2B in FIG. 2A.

FIGS. 2A and 2B illustrate a compression/expansion device according to another embodiment. A compression/expansion device 200 includes a pressure vessel 220, a working chamber 240 contained within the pressure vessel, an actuator 222 coupled to the pressure vessel 220, and a heat transfer element 224 disposed within working chamber 240. The compression/expansion device 200 can be used, for example, to compress a gas, such as air, within the pressure vessel 220 and/or to pressurize and/or pump a liquid, such as water. The compression/expansion device 200 can also be used in a compression and expansion system such as a compressed air energy storage system.

The compression/expansion device 200 also includes an inlet conduit 228 (also referred to as "inlet") and an outlet conduit 230 (also referred to as "outlet") each in fluid communication with the working chamber 240 and configured to communicate a liquid to and from the working chamber 240, from and to the actuator 222, respectively. The compression/expansion device 200 also includes an inlet conduit 232 and an outlet conduit 234 each in fluid communication with the working chamber 240. The inlet 232 is configured to introduce gas (e.g., air) into the working chamber 240, and the outlet 234 is configured to remove gas out of the pressure vessel 220. The compression/expansion device 200 can also include multiple valves 236 coupled to the inlets 228, 232 and outlets 230, 234 and/or to the pressure vessel 220, as described previously. The valves can be configured to operatively open and close the fluid communication to and from the working chamber 240.

As described above for actuator 122, the actuator 222 can be, for example a pneumatic or hydraulic actuator that moves a liquid in and out of the working chamber 240 via the inlet 228 and the outlet 230, respectively. For example, the actuator 222 can include a water pump (not shown) that drives a hydraulically driven piston (not shown) disposed within a housing (not shown) and can be driven with one or more hydraulic pumps (not shown) to move the liquid in and out of the working chamber 240. For example, a volume of liquid can be moved into the working chamber 240 via the inlet 228 such that the volume of the working chamber 240 that can contain the quantity of gas within the working chamber 240 is reduced, thus compressing the gas, which can be discharged from the working chamber 240 via the outlet 234. After the compressed gas has exited the pressure vessel 220, the liquid can be moved out of the working chamber 240 via the outlet 230 as a quantity of gas is introduced into the working chamber 240 via the inlet 232. This process can be repeated to alternately pump liquid and gas into and out of the pressure vessel.

As described above, heat energy is generated during the compression cycle by the compression of the gas contained within the working chamber 240. Some of this heat energy can be transferred from the gas to the liquid introduced into the working chamber 240 during the compression process. Some of this heat energy can also be transferred from the gas to the heat transfer element 224.

In this embodiment, the heat transfer element 224 includes multiple elongate members 238 arranged in a bundle and extending vertically within the working chamber 240. The elongate members 238 can be coupled together with a strap or band 250 that is coupled to the wall of the pressure vessel 220 with a suitable coupling mechanism 252, such as, for example, a bracket or clamp bolted to the wall of the pressure vessel 220. As the liquid flows into the working chamber 240 via the inlet 228, the liquid can flow between the elongate members 232 and compress the gas (e.g., air) disposed within the working chamber 240, until the compressed air exits the outlet 234. Thus, heat energy generated during the compression cycle can be transferred from the gas to the liquid and/or to the elongate members 238 of the heat transfer element 224.

In alternative embodiments, the bundle of elongate members 238 can be coupled to the pressure vessel using different coupling methods and/or coupled at a different location than illustrated in FIGS. 2A and 2B. In some embodiments, the elongate members 238 can have a length such that they extend to a bottom surface of the working chamber 240 and/or a top surface of the working chamber 240. Additionally, although the elongate members 238 are shown solid in the above example, it should be understood the heat transfer element 224 can alternatively include elongate members that are tubular (e.g., have internal lumens). In such an alternative embodiment, the air and liquid can flow between the elongate members and through the lumens of the elongate members.

Figure 3A:
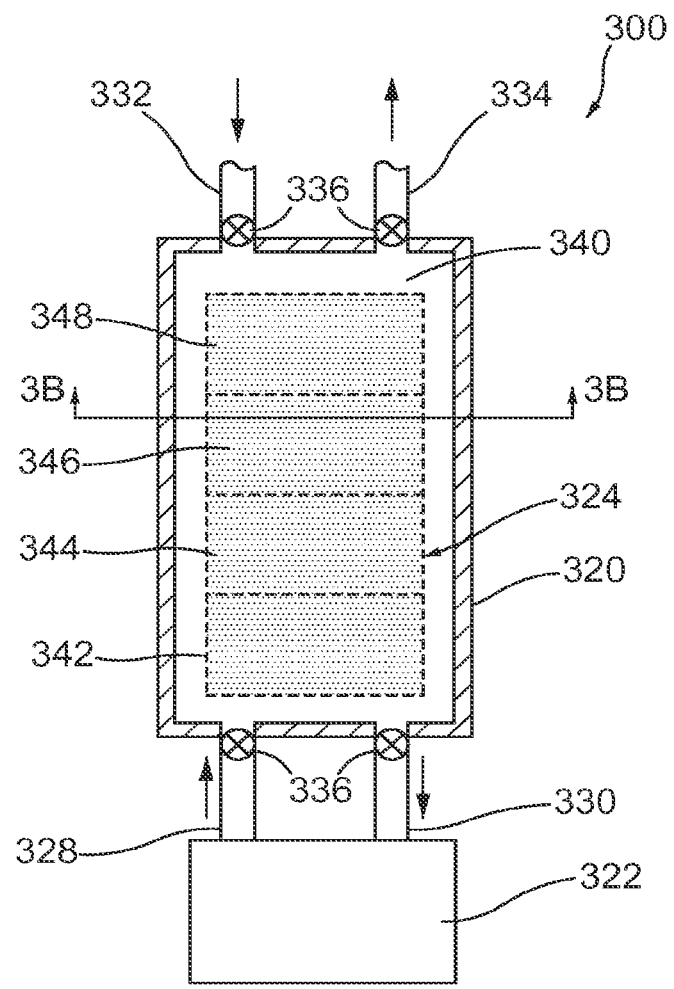
FIG. 3A is a side view shown partially in cross-section of a portion of a compression and/or expansion device, according to another embodiment.
Figure 3B:
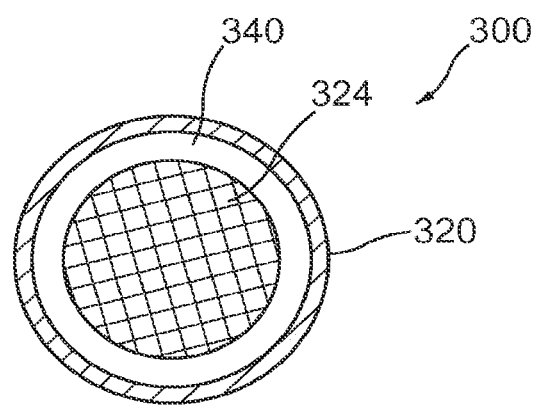
FIG. 3B is a cross-sectional view of the compression and/or expansion device of FIG. 3A, taken along line 3B-3B in FIG. 3A.

FIGS. 3A and 3B illustrate a compression/expansion device according to another embodiment. A compression/expansion device 300 includes a pressure vessel 320, an actuator 322 coupled to the pressure vessel 320, and a heat transfer element 324 disposed within a working chamber 340 of the pressure vessel 320.

The compression/expansion device 300 also includes an inlet conduit 328 and an outlet conduit 330 each in fluid communication with the working chamber 340 and configured to communicate a liquid to and from the working chamber 340, from and to the actuator 322, respectively. The compression/expansion device 300 also includes an inlet conduit 332 and an outlet conduit 334 each in fluid communication with the working chamber 340. The inlet 332 is configured to introduce gas (e.g., air) into the pressure vessel 320, and the outlet 334 is configured to remove gas out of the pressure vessel 320. The compression/expansion device 300 can also include multiple valves 336 coupled to the inlets 328, 332 and outlets 330, 334 and/or to the pressure vessel 320, as described previously.

The actuator 322 can be structurally and functionally the same as, or similar to, the actuator 222 and can be actuated to move a liquid in and out of the working chamber 340 via the inlet 328 and the outlet 330, respectively.

The heat transfer element 324 can be used to remove heat energy from the air within the working chamber 340 during the compression cycle as previously described. In this embodiment, the heat transfer element 324 includes a three-dimensional net or mesh structure. As described above, such a heat transfer element 324 can hold liquid, or liquid droplets, in a spatially distributed pattern to create an air-to-liquid geometry that can facilitate the ready flow of heat energy between the air and the liquid. In addition, although not necessary, in this embodiment, the heat transfer element 324 varies in density in a direction of movement of the surface of the liquid as liquid is added to the working chamber 340. For example, in this embodiment, the heat transfer element 324 includes four portions, 342, 344, 346 and 348 each having a different density, i.e. a different volume of fibers or filaments per unit volume in the working chamber 340. The portion 342 near the beginning of the compression cycle has the lowest density, and the portion 348 near the end of the compression cycle has the highest density. The increase in density from portion 342 to portion 348 helps to compensate for the decreasing axial length of the heat transfer element that is exposed to the gas as the surface of the liquid rises—the higher surface area per unit length allows for more heat transfer from the air to the heat transfer element 324 than in the lower density portions of the heat transfer element 324.

Figure 4A:
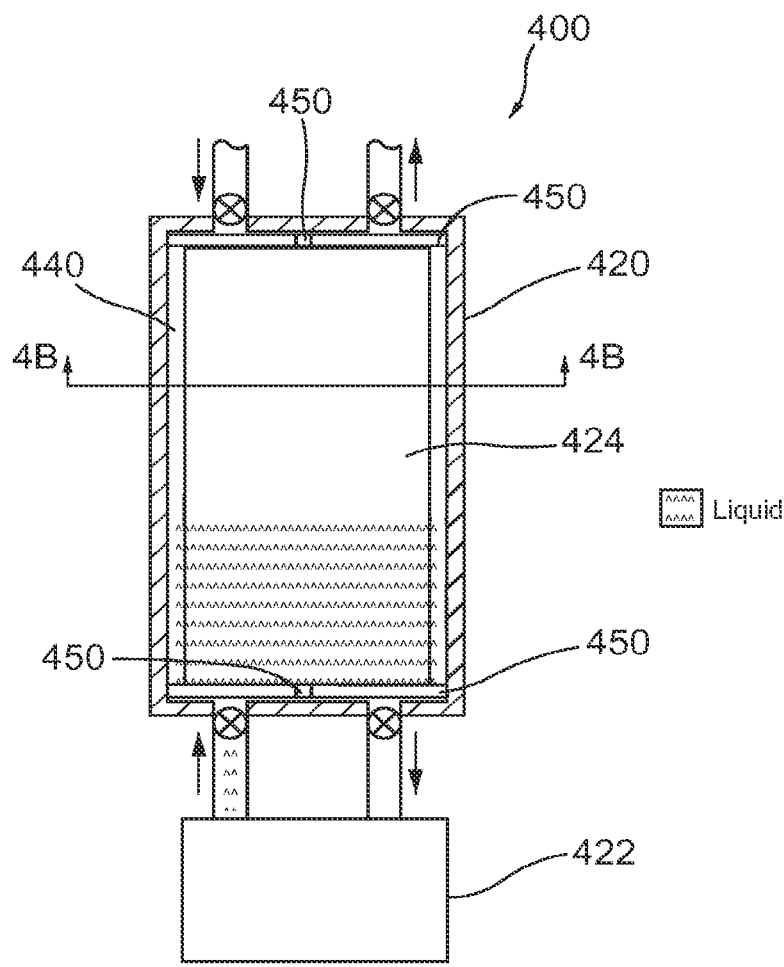
FIG. 4A is a side view shown partially in cross-section of a portion of a compression and/or expansion device, according to another embodiment.
Figure 4B:
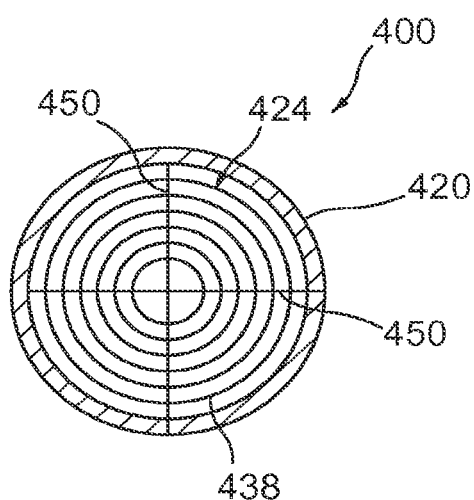
FIG. 4B is a cross-sectional view of the compression and/or expansion device of FIG. 4A, taken along line 4B-4B in FIG. 4A.

FIGS. 4A and 4B illustrate another embodiment of a compression/expansion device. A compression/expansion device 400 includes a pressure vessel 420 and an actuator 422 coupled to the pressure vessel 420. The pressure vessel 420 and actuator 422 can each be structurally and functionally the same as, or similar to, the pressure vessels 220 and 320 and the actuator 222 and 322, and therefore, are not described in detail with reference to this embodiment. The compression/expansion device 400 also includes a heat transfer element 424 disposed within a working chamber 440 of the pressure vessel 420. As with the previous embodiments, the compression/expansion device 400 can be used to compress a gas, such as air, within the pressure vessel 420 and/or to pressurize and/or pump a liquid, such as water. The compression/expansion device 400 can also be used in a compression and expansion system such as a compressed air energy storage system.

In this embodiment, the heat transfer element 424 includes multiple tubular members 438 arranged concentrically within each other. The concentric tubular members 438 can be coupled to a wall of the pressure vessel 420 with, for example, one or more braces 450. The concentric tubular members 438 are disposed within the interior of the working chamber 440 in a vertical orientation such that gas and/or liquid can flow through the annular spaces created by the concentric tubular members 438 as the gas and/or liquid is moved through the pressure vessel 420 during a compression cycle. In some embodiments, the concentric tubular members 438 may have a varying diameter along their length. For example, in an alternative embodiment, a compression/expansion device 400 can include concentric tubular members 438 that are tapered. In some embodiments, the tubular members 438 can have varying lengths, e.g. some of the tubular members 438 extend the full length of the working chamber 440, while others extend only partway down from the top of the working chamber 440. This yields a total surface area per unit length of the portion of the heat transfer element 424 that is above the surface of the liquid (i.e. in contact with the gas) that increases as the surface of the liquid rises—that is, the density of the heat transfer element 424 is higher at its upper end than at its lower end.

FIGS. 5A and 5B illustrate another embodiment of a compression/expansion device. A compression/expansion device 500 includes a pressure vessel 520 and an actuator 522 coupled to the pressure vessel 520. The compression/expansion device 500 also includes a heat transfer element 524 disposed within a working chamber 540 of the pressure vessel 520.

The compression/expansion device 500 also includes an inlet conduit 528 (also referred as "inlet") and an outlet conduit 530 each in fluid communication with the working chamber 540 of the pressure vessel 520 and configured to communicate a liquid to and from the working chamber 540, from and to the actuator 522, respectively. The compression/expansion device 500 also includes an inlet conduit 532 and an outlet conduit 534 each in fluid communication with the working chamber 540 of the pressure vessel 520. The inlet 532 is configured to introduce gas (e.g., air) into the working chamber 540, and the outlet 534 is configured to remove gas from the working chamber 540. The compression/expansion device 500 can also include multiple valves 536 coupled to the inlets 528, 532 and outlets 530, 534 and/or to the pressure vessel 520, as described previously.

The actuator 522 can be structurally and functionally the same as, or similar to, for example, the actuator 222 and can be actuated to move a liquid in and out of the working chamber 540 via the inlet 528 and the outlet 530, respectively.

As with previous embodiments, the heat transfer element 524 can be used to remove heat energy from the air within the working chamber 540 by providing an increased amount of surface area within the working chamber 540 that is in direct contact with the air being compressed. In this embodiment, the heat transfer element 524 includes multiple metal plates 538 (also referred to as "plates") that are coupled together in a stack. In some embodiments, plates 538 having a positive buoyancy can be coupled together such that as the liquid flows within the pressure vessel 520 to compress the gas, the liquid can exert a force on the plates 538 causing the plates 538 to compact into a smaller overall height as shown in FIG. 5B. In other embodiments, plates 538 without positive buoyancy can be incorporated into devices 500 having a piston in the working chamber 540 such that the piston collapses the plates 538 as the stroke progresses. For example, the plates 538 can be coupled together with one or more cords 525 similar to window blinds. The cords 525 can also be used to couple the plates 538 to an interior wall of the pressure vessel 520. Although the heat transfer element 524 is shown as having a particular length or height within the working chamber 540 of the pressure vessel 520, it should be understood that the heat transfer element 524 can be any length within the pressure vessel 520. In some embodiments, for example, the heat transfer element 524 can have a length or height that extends substantially along the length or height of the working chamber 540 of the pressure vessel 540.

In use, to compress a gas, such as air within the compressor device 500, a volume of gas having a first pressure can be introduced through the inlet 528 and into the working chamber 540 of the pressure vessel 520. The actuator 522 can be actuated to pump a volume of liquid into the pressure vessel 520 via the inlet 528. As the liquid flows within the working chamber 540 of the pressure vessel 520 in the direction of arrow A (shown in FIG. 5B), the liquid can compress the gas within the pressure vessel 520 and force or displace the compressed gas out of the pressure vessel 520 and into the outlet 530. Thus, the compressed gas exiting the working chamber 540 has a greater pressure than the gas that enters the working chamber 540. As the surface of the liquid in the direction of arrow A, the plates 538 of the heat transfer element 524 will collapse upon each other to form a dense stack at the end of the compression cycle as shown in FIG. 5B. During the compression cycle, heat energy generated during the process can be transferred from the gas to the heat transfer element 524 as described above for previous embodiments. As the heat transfer element 524 collapses upon itself during the compression cycle, the heat transfer element 524 becomes more dense, and therefore, more heat can be transferred to the heat transfer element 524 as the compression cycle progresses. Said another way, the total surface area of the heat transfer element 524 is available for heat transfer (i.e. is above the surface of the liquid and thus in contact with the air) at the end of the compression cycle as well as at the beginning of the cycle.

Figure 6A:
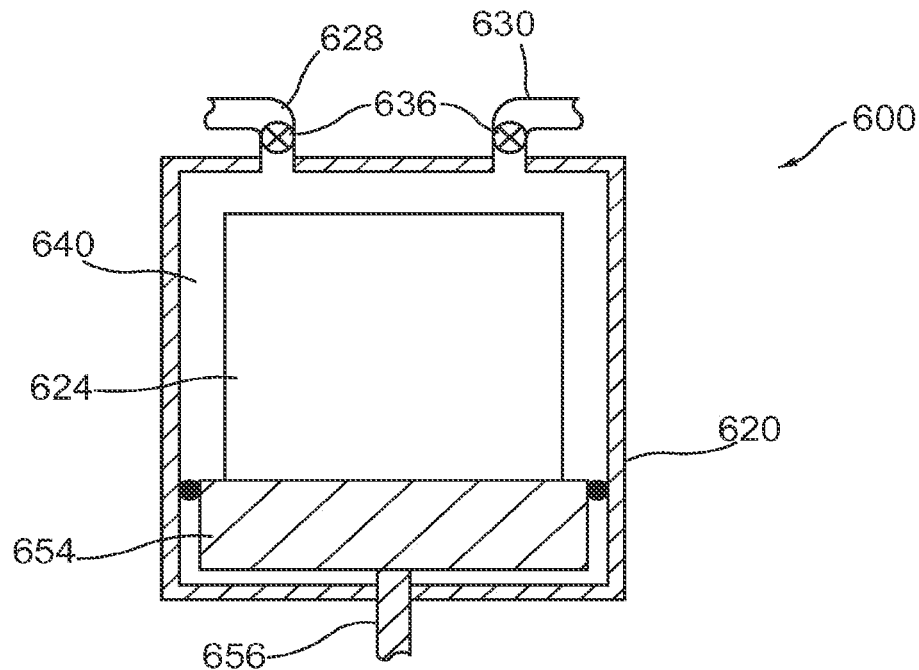
FIG. 6A is a side view shown partially in cross-section of a portion of a compression and/or expansion device, according to another embodiment and shown in a first configuration.
Figure 6B:
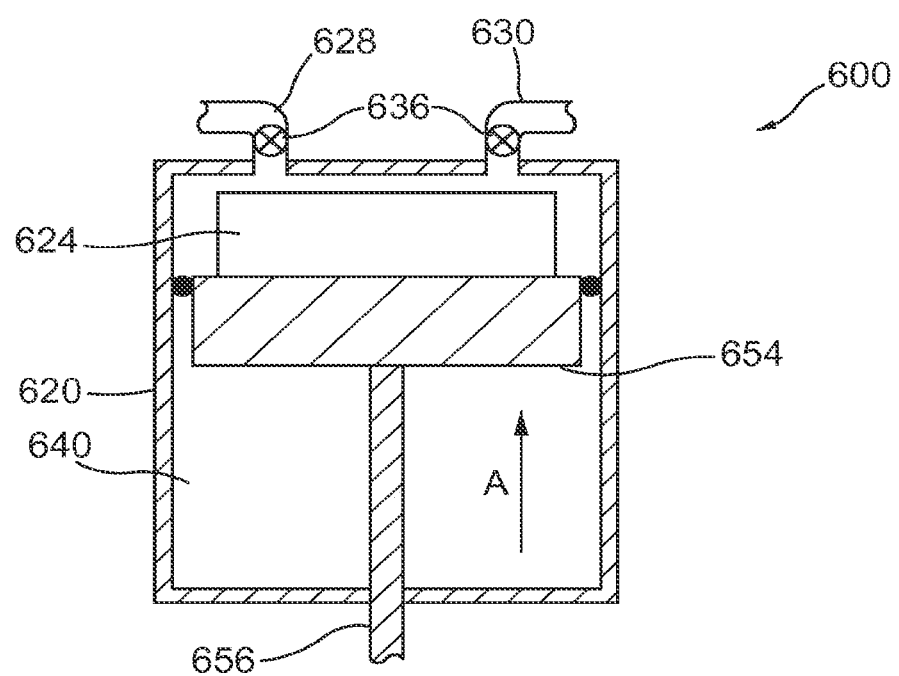
FIG. 6B is a side a side view shown partially in cross-section of the portion of a compression and/or expansion device of FIG. 6A, shown in a second configuration.

FIGS. 6A and 6B illustrate another embodiment of a compression/expansion device. A compression/expansion device 600 includes a pressure vessel 620 having a working chamber 640, a heat transfer element 624 disposed within the working chamber 640, and a piston 654 movable within the pressure vessel 620 to change the volume of the working chamber 640. The piston 654 can be coupled to a suitable actuator (not shown) via a piston rod 656. The actuator can be, for example, a hydraulic or pneumatic actuator and can include an electric motor as previously described.

The compression/expansion device 600 also includes an inlet conduit 628 and an outlet conduit 630 each in fluid communication with the working chamber 640. The inlet 628 can be coupled to a source of gas (e.g., air) and can communicate the gas to the working chamber 640. The outlet 630 can be configured to communicate the gas from the working chamber 640 to another location. Valves 636 can be coupled to the inlet 628 and outlet 630 and can be operated to open and close the fluid communication to and from the pressure vessel 620 as described above for previous embodiments.

As with previous embodiments, the heat transfer element 624 can be used to remove heat energy from the gas within the pressure vessel 620 by providing an increased amount of surface area within the pressure vessel 620 that is in direct contact with the gas being compressed. In this embodiment, the heat transfer element 624 includes a collapsible coil member (shown schematically). As the piston 654 moves during a compression cycle, the piston 654 can exert a force on the heat transfer element 624 causing the heat transfer element 624 to collapse or compact into a smaller overall height, as shown in FIG. 6B.

In some embodiments, the heat transfer element 624 can be coupled to the piston 654 such that it moves directly with the piston 654. In some embodiments, the heat transfer element 624 can be coupled to the pressure vessel 620. In some embodiments, the heat transfer element 624 can be coupled to both the piston 654 and the pressure vessel 620.

In use, to compress a gas, such as air, within the compression/expansion device 600, a quantity of gas having a first pressure can be introduced through the inlet 628 and into the working chamber 640. The piston 654 can be actuated to move the piston 654 from a first position as shown in FIG. 6A to a second position as shown in FIG. 6B. As the piston 654 moves in the direction of arrow A (shown in FIG. 6B), the piston 654 compresses the gas within the working chamber 640. The compressed gas can then be expelled from the working chamber 640 via the outlet 630. As the piston 654 moves in the direction of arrow A, the heat transfer element 624 (collapsible coil member) collapses, increasing its effective density. Its density is the greatest at the end of the compression stroke of the piston 554. Said another way, the total surface area of the heat transfer element 624 is exposed to the air throughout the compression cycle.

In some embodiments, the working chamber 640 can be partially filled with a liquid (e.g., water) that can be communicated to and from the working chamber 640 via the inlet conduit 628 and the outlet conduit 630, respectively, or via other conduits (not shown). During the compression cycle, heat energy generated during the compression process can be transferred from the gas, to the heat transfer element 624, and then to the liquid as described above for previous embodiments. A volume of the heated liquid can then be discharged from the pressure vessel 620 via the outlet conduit 630 or via a separate liquid discharge conduit (not shown).

In some embodiments, the working chamber can be configured to combine the techniques described above, i.e. the working chamber can have a variable volume, e.g. using a cylinder and piston as described above, and the portion of the variable volume that can be occupied by gas can be changed by introducing liquid into, or removing a liquid from, the working chamber. For example, a quantity of gas having a first pressure can be introduced through the inlet 628 and into the working chamber 640. The piston 654 can be actuated to move the piston 654 from a first position as shown in FIG. 6A to a second position as shown in FIG. 6B. As the piston 654 moves in the direction of arrow A (shown in FIG. 6B), the piston 654 compresses the gas within the working chamber 640. During the compression cycle, heat energy generated during the compression process can be transferred from the gas, to the heat transfer element 624. Before the start of the compression cycle, and/or at any time during the compression cycle, liquid can be introduced into the working chamber 640 via the inlet conduit 628 or via a separate liquid inlet conduit (not shown) to quench the heat transfer element 624, thereby transferring the heat energy to the liquid as described above for previous embodiments. A volume of the heated liquid can then be discharged from the pressure vessel 620 via the outlet conduit 630 or via a separate liquid discharge conduit (not shown).

Figure 7A:
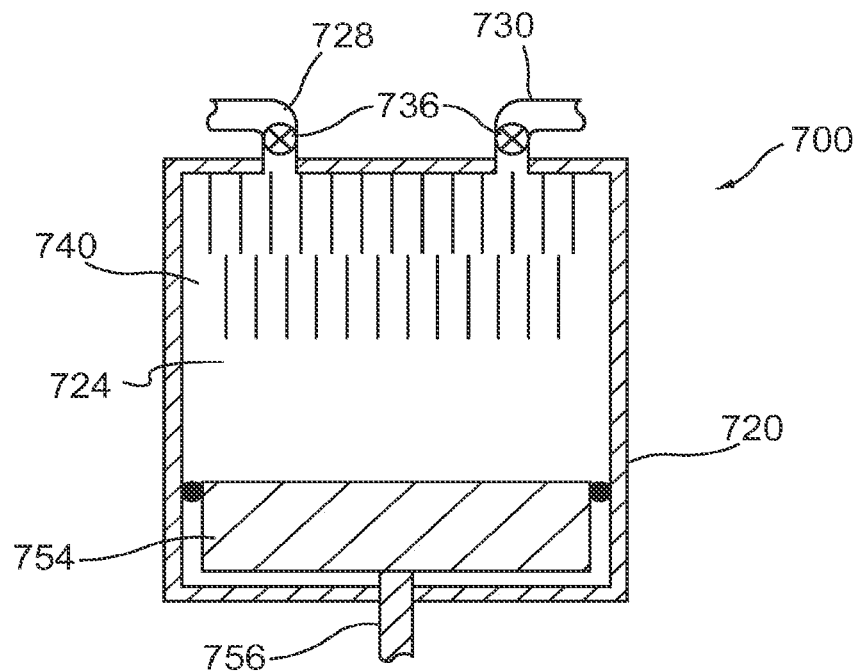
FIG. 7A is a side view shown partially in cross-section of a portion of a compression and/or expansion device, according to another embodiment and shown in a first configuration.
Figure 7B:
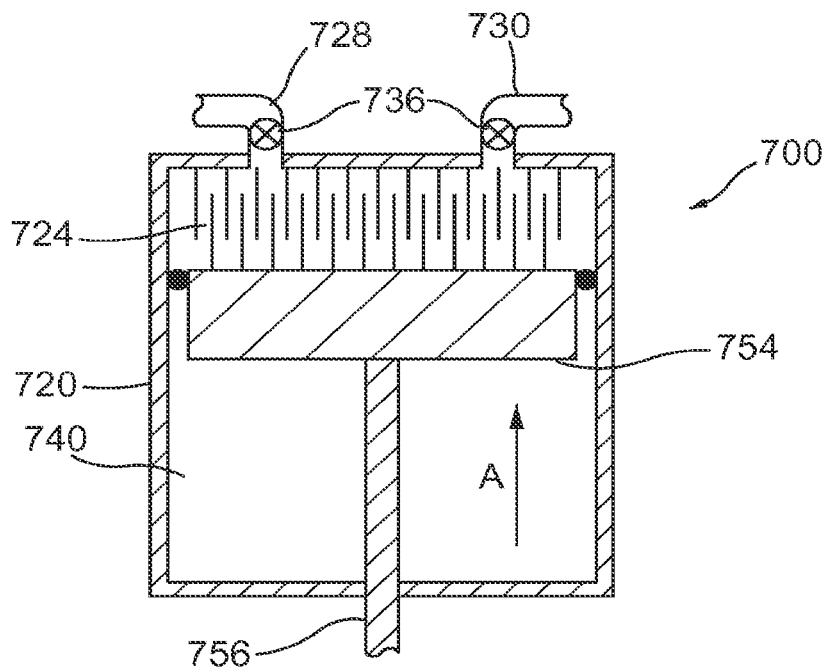
FIG. 7B is a side a side view shown partially in cross-section of the portion of a compression and/or expansion device of FIG. 7A, shown in a second configuration.

FIGS. 7A and 7B illustrate another embodiment of a compression/expansion device. A compression/expansion device 700 includes a pressure vessel 720 having a working chamber 740, a heat transfer element 724 disposed within the working chamber 740, and a piston 754 movable within the pressure vessel 720 to change the volume of the working chamber 740. The piston 754 can be coupled to a suitable actuator (not shown) via a piston rod 756. The actuator can be, for example, a hydraulic or pneumatic actuator and can include an electric motor as previously described.

The compression/expansion device 700 also includes an inlet conduit 728 and an outlet conduit 730 each in fluid communication with the working chamber 740. The inlet 728 can be coupled to a source of gas (e.g., air) and can communicate the gas to the working chamber 740. The outlet 730 can be configured to communicate the gas from the working chamber 740 to another location. Valves 736 can be coupled to the inlet 728 and outlet 730 and can be operated to open and close the fluid communication to and from the pressure vessel 720 as described above for previous embodiments.

As with previous embodiments, the heat transfer element 724 can be used to remove heat energy from the gas within the pressure vessel 720 by providing an increased amount of surface area within the pressure vessel 720 that is in direct contact with the gas being compressed. In this embodiment, the heat transfer element 724 includes two rows of vertical fins with the second row being offset from the first row. As the piston 754 moves in the direction of arrow A during a compression cycle, the piston 754 moves the second row of vertical fins toward the first row of vertical fins that are attached to the pressure vessel 720. The fins are offset such that the fins are interleaved at the end of the compression stroke as shown in FIG. 7B, thereby increasing the effective density of the heat transfer element 724. Its density is the greatest at the end of the compression stroke of the piston 754.

In some embodiments, the working chamber 740 can be partially filled with a liquid (e.g., water) that can be communicated to and from the working chamber 740 via the inlet conduit 728 and the outlet conduit 730, respectively, or via other conduits (not shown). During the compression cycle, heat energy generated during the compression process can be transferred from the gas, to the heat transfer element 724, and then to the liquid as described above for previous embodiments. A volume of the heated liquid can then be discharged from the pressure vessel 720 via the outlet conduit 730 or via a separate liquid discharge conduit (not shown).

Figure 8:
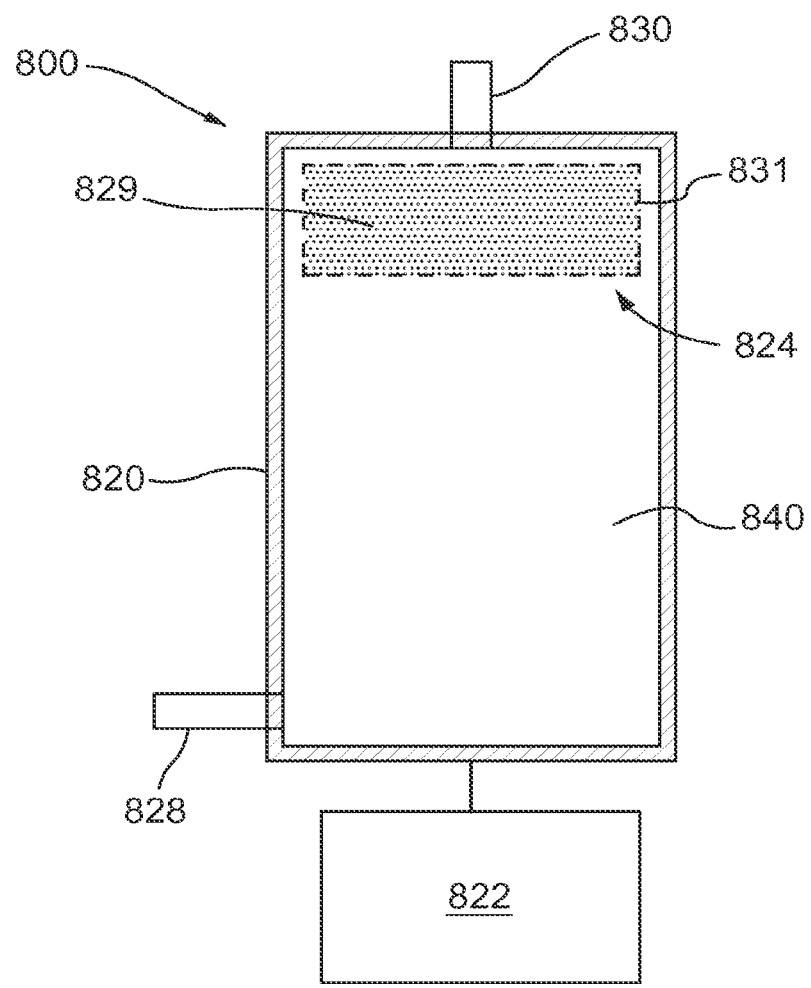
FIG. 8 is a side view shown partially in cross-section of a portion of a compression and/or expansion device, according to another embodiment.

FIG. 8 illustrates another embodiment of a compression/expansion device. A compression/expansion device 800 includes a pressure vessel 820 having a working chamber 840, a heat transfer element 824 disposed within the working chamber 840, an actuator 822, and inlet and outlet conduits 828, 830 in fluidic communication with the working chamber. The compression/expansion device may also include a piston (not shown) driven by actuator 822. Gas contained in the working chamber can be compressed by introducing liquid into the working chamber to reduce the portion of the volume of the working chamber available to contain the gas and/or by reducing the volume of the working chamber by driving the piston towards the upper end of the working chamber. Alternatively, compressed gas in the working chamber can expel liquid from the working chamber, increasing the portion of the volume of the working chamber available to contain the gas, and/or urge the piston downwardly, allowing the gas to expand. The pressure vessel 820, actuator 822, inlet conduit 828 and outlet conduit 830, etc. can each be structurally and functionally the same as, or similar to, the pressure vessels, actuators and conduits in other embodiments, and therefore, are not described in further detail with reference to this embodiment.

In this embodiment, the heat transfer element 824 is in the form of numerous discrete metal pieces (e.g. shavings, disks, chips and/or other shapes) 829 contained within a porous container 831 disposed at a top portion of the working chamber 840. The metal pieces can be formed from, for example, stainless steel, or another material that provides a high volumetric specific heat as compared to air. The metal pieces configuration of the heat transfer element 824 provides a high surface area per unit volume which the compressed gas contacts as it flows through the porous container 831, thus resulting in increased heat transfer. Alternatively, instead of being formed of discrete pieces, the heat transfer element can be formed as a more unitary or interconnected structure, which may not require a container to hold them in a desired position, such as a wool or mesh. The heat transfer element 824 in this embodiment is disposed near one end of the working chamber 840 (i.e. in the portion occupied by the gas near the end of the compression cycle), such that the heat transfer element 824 is exposed to the gas, but not in contact with the liquid, throughout all or most of the compression cycle, including the end when the gas is at or near the its maximum temperature as it passes through the heat transfer element 824. Thus, as the gas is compressed during the compression cycle, and the mechanical work on the air adds heat energy to the gas, the heat energy is continuously transferred (primarily by conductive and/or convective, rather than radiant, heat transfer) to the heat transfer element 824. This maintains the temperature of the gas at a lower value than would be the case without the heat transfer element 824, and gradually increases the temperature of the heat transfer element. At the end of the compression cycle, the pressurized gas can be released from the pressure vessel 820, to the next component in the system 800. More liquid can then be introduced into the working chamber 840, to substantially fill the volume occupied by the heat transfer element 824. The heat energy stored in the heat transfer element 824 can then be transferred (again, by conductive and/or convective transfer) to the liquid in the working chamber 840. The heat energy may then be transferred out of the pressure vessel by any suitable mechanism.

Figure 9:
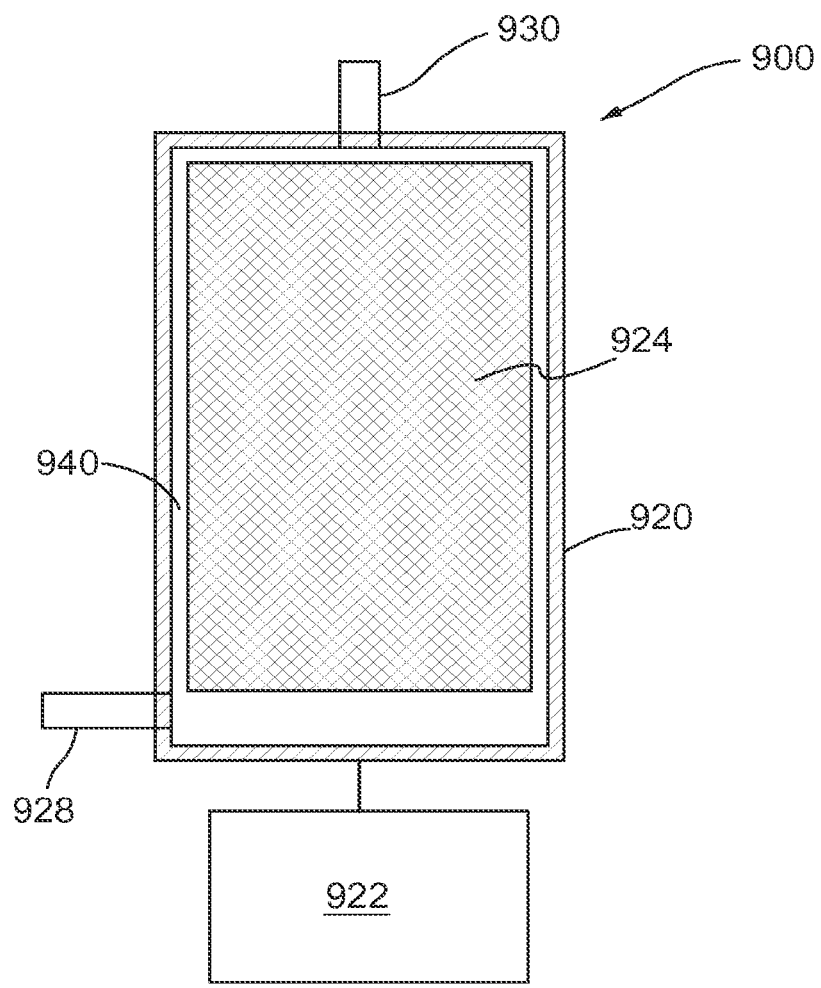
FIG. 9 is a side view shown partially in cross-section of a portion of a compression and/or expansion device, according to another embodiment.

FIG. 9 illustrates another embodiment of a compression/expansion device. A compression/expansion device 900 includes a pressure vessel 920 having a working chamber 940, and a heat transfer element 924 disposed within the working chamber 940, an actuator 922, and inlet and outlet conduits 928, 930 in fluidic communication with the working chamber. The compression/expansion device may also include a piston (not shown) driven by actuator 922. The pressure vessel 920, actuator 922, inlet conduit 928 and outlet conduit 930, etc. can each be structurally and functionally the same as, or similar to, the pressure vessels, actuators and conduits in other embodiments, and therefore, are not described in detail with reference to this embodiment.

In this embodiment, the heat transfer element 924 can be disposed within a substantial portion of the working chamber 940 such that gas and liquid can flow through the heat transfer element 924 as the liquid compresses the gas within the working chamber 940. The heat transfer element 924 can be, for example, discrete pieces held in a container (as described above), or a more unitary structure such as a mesh or wool that is sufficiently porous so as to not to materially inhibit the flow of the gas and/or liquid within the working chamber 940, while at the same time provide high surface area for contact with the gas. In this embodiment, the heat transfer element 924 is in contact with both gas and liquid from the beginning of the compression cycle, with progressively less being exposed to gas, and progressively more being exposed to liquid, as the cycle progresses.

It is to be understood that the heat transfer elements 824 and 924 can alternatively have other shapes and configurations, while maintaining the properties to function as described. For example, a heat transfer element can be a metal wool configuration (e.g., steel wool or scrubby pads) or other shapes and configurations that provide a high surface area per unit volume for contact with the gas. In some embodiments, a metal mesh configuration as described for heat transfer element 924 can be disposed at only a top portion of the working chamber as described for device 800. Similarly, metal pieces as described for heat transfer element 824 can be disposed in a larger container that occupies a larger portion of the working chamber, similar to the heat transfer element 924.

In addition, in other embodiments, a heat transfer element can be positioned at different locations within a pressure vessel than what is shown in FIGS. 8 and 9. In some embodiments, more than one heat transfer element can be used. In such an embodiment, more than one of the same type of heat transfer element can be used, or a combination of different configurations can be used. In addition, within a given compression and expansion system, one or more of the same or different combinations of heat transfer elements can be used in one or more of the pressure vessels of that system.

Figure 10A:
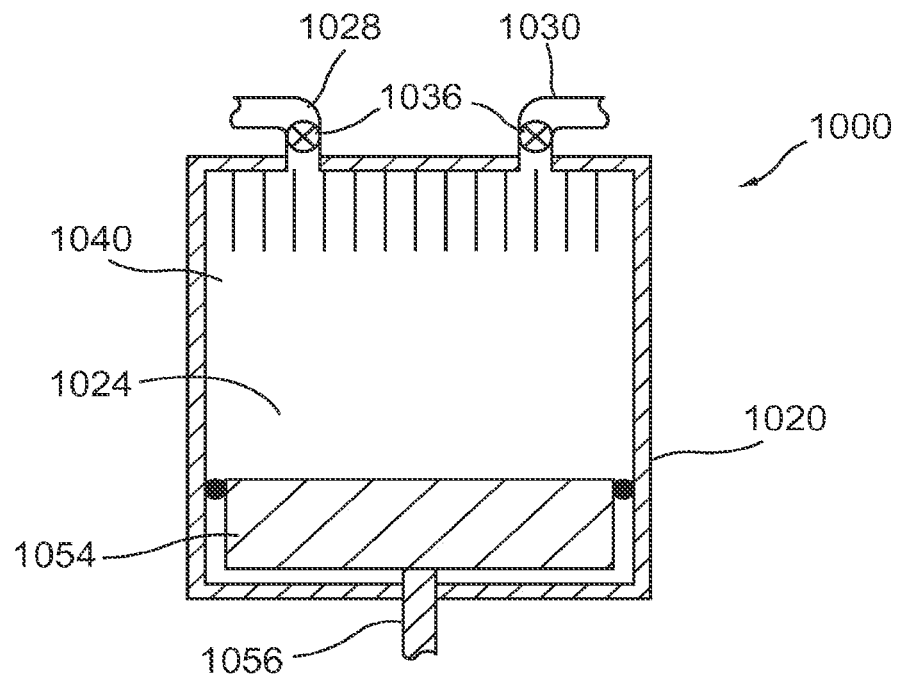
FIG. 10A is a side view shown partially in cross-section of a portion of a compression and/or expansion device, according to another embodiment and shown in a first configuration.
Figure 10B:
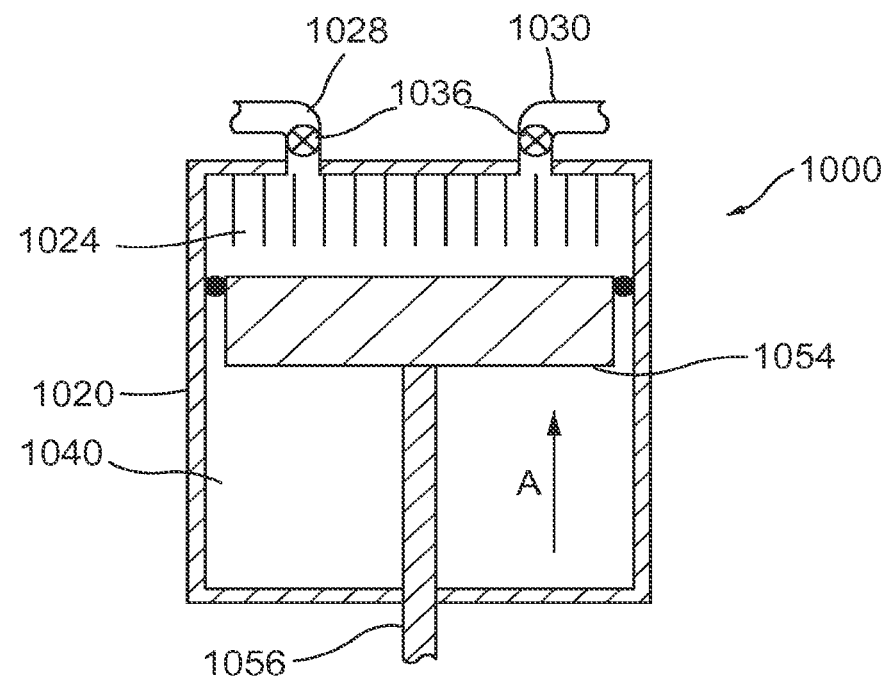
FIG. 10B is a side a side view shown partially in cross-section of the portion of a compression and/or expansion device of FIG. 10A, shown in a second configuration.

FIGS. 10A and 10B illustrate another embodiment of a compression/expansion device. A compression/expansion device 1000 includes a pressure vessel 1020 having a working chamber 1040, a heat transfer element 1024 disposed within the working chamber 1040, and a piston 1054 movable within the pressure vessel 1020 to change the volume of the working chamber 1040. The piston 1054 can be coupled to a suitable actuator (not shown) via a piston rod 1056. The actuator can be, for example, a hydraulic or pneumatic actuator and can include an electric motor as previously described.

The compression/expansion device 1000 also includes an inlet conduit 1028 and an outlet conduit 1030 each in fluid communication with the working chamber 1040. The inlet 1028 can be coupled to a source of gas (e.g., air) and can communicate the gas to the working chamber 1040. The outlet 1030 can be configured to communicate the gas from the working chamber 1040 to another location. Valves 1036 can be coupled to the inlet 1028 and outlet 1030 and can be operated to open and close the fluid communication to and from the pressure vessel 1020 as described above for previous embodiments.

As with previous embodiments, the heat transfer element 1024 can be used to remove heat energy from the gas within the pressure vessel 1020 by providing an increased amount of surface area within the pressure vessel 1020 that is in direct contact with the gas being compressed. In this embodiment, the heat transfer element 1024 includes a plurality of vertical fins attached to the pressure vessel 1020. In other embodiments, the plurality of vertical fins can be attached to the piston 1054. As the piston 1054 moves in the direction of arrow A during a compression cycle, the gas can flow through the heat transfer element 1024 as the piston 1054 compresses the gas within the working chamber 1040 allowing heat to be transferred from the gas, to the heat transfer element 1024.

In some embodiments, the working chamber 1040 can be partially filled with a liquid (e.g., water) that can be communicated to and from the working chamber 1040 via the inlet conduit 1028 and the outlet conduit 1030, respectively, or via other conduits (not shown). During the compression cycle, heat energy generated during the compression process can be transferred from the gas, to the heat transfer element 1024, and then to the liquid as flows through the heat transfer element 1024. A volume of the heated liquid can then be discharged from the pressure vessel 1020 via the outlet conduit 1030 or via a separate liquid discharge conduit (not shown).

Figure 11A:
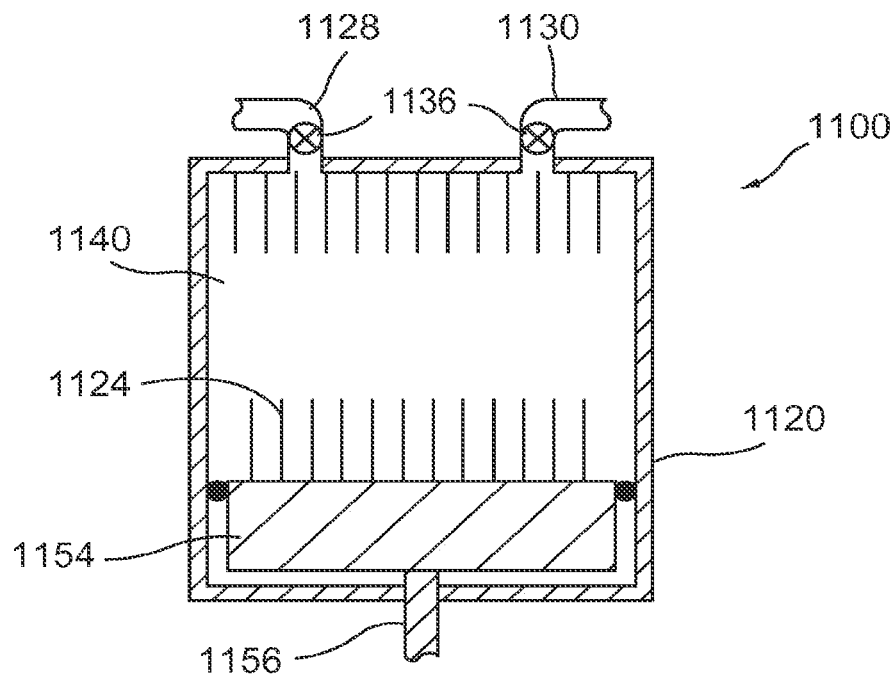
FIG. 11A is a side view shown partially in cross-section of a portion of a compression and/or expansion device, according to another embodiment and shown in a first configuration.
Figure 11B:
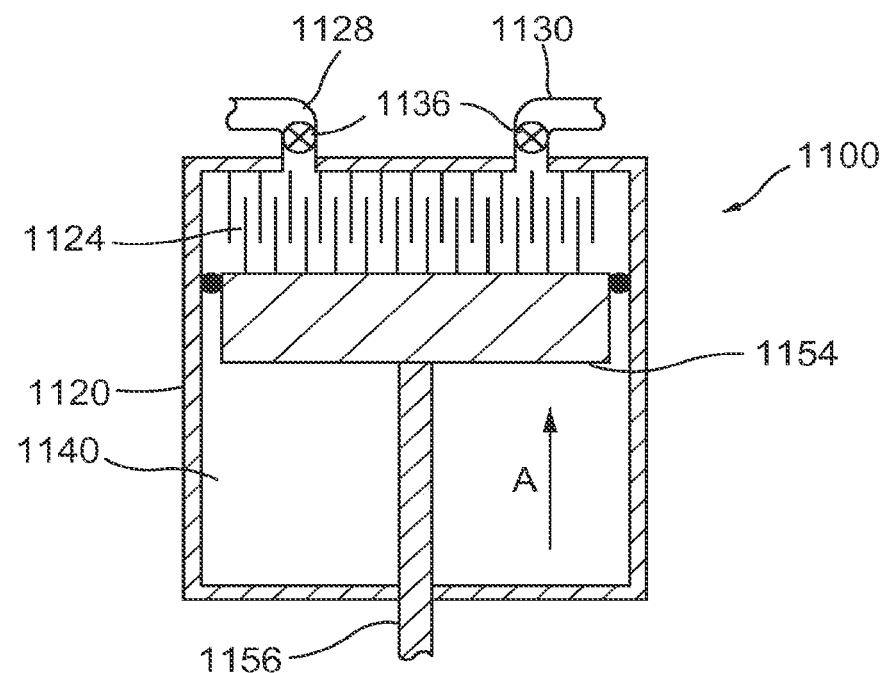
FIG. 11B is a side a side view shown partially in cross-section of the portion of a compression and/or expansion device of FIG. 11A, shown in a second configuration.

FIGS. 11A and 11B illustrate another embodiment of a compression/expansion device. A compression/expansion device 1100 includes a pressure vessel 1120 having a working chamber 1140, a heat transfer element 1124 disposed within the working chamber 1140, and a piston 1154 movable within the pressure vessel 1120 to change the volume of the working chamber 1140. The piston 1154 can be coupled to a suitable actuator (not shown) via a piston rod 1156. The actuator can be, for example, a hydraulic or pneumatic actuator and can include an electric motor as previously described.

The compression/expansion device 1100 also includes an inlet conduit 1128 and an outlet conduit 1130 each in fluid communication with the working chamber 1140. The inlet 1128 can be coupled to a source of gas (e.g., air) and can communicate the gas to the working chamber 1140. The outlet 1130 can be configured to communicate the gas from the working chamber 1140 to another location. Valves 1136 can be coupled to the inlet 1128 and outlet 1130 and can be operated to open and close the fluid communication to and from the pressure vessel 1120 as described above for previous embodiments.

As with previous embodiments, the heat transfer element 1124 can be used to remove heat energy from the gas within the pressure vessel 1120 by providing an increased amount of surface area within the pressure vessel 1120 that is in direct contact with the gas being compressed. In this embodiment, the heat transfer element 1124 includes a plurality of vertical fins attached to both the pressure vessel 1120 and to the piston 1154. As the piston 1154 moves in the direction of arrow A during a compression cycle, the piston 1154 moves the vertical fins attached to the piston 1154 toward the vertical fins attached to the pressure vessel 1120. The fins attached to the pressure vessel 1120 are offset from the fins attached to the piston 1154 such that the fins are interleaved at the end of the compression stroke as shown in FIG. 11B, thereby increasing the effective density of the heat transfer element 1124. Its density is the greatest at the end of the compression stroke of the piston 1154.

In some embodiments, the working chamber 1140 can be partially filled with a liquid (e.g., water) that can be communicated to and from the working chamber 1140 via the inlet conduit 1128 and the outlet conduit 1130, respectively, or via other conduits (not shown). The interleaving of the two sets of fins reduces the volume of liquid needed to quench the heat transfer element 1124 at the end of a compression cycle. For example, the volume of the liquid in the working chamber 1140 can be reduced such that there is only enough liquid to occupy the interstitial spaces between the fully interleaved sets of fins at the end of the compression stroke. As has been described herein, liquid within the working chamber represents a reduction in the amount of gas that can be compressed or expanded. Thus, it is advantageous to reduce the volume occupied by the heat transfer element and the liquid in order to increase the power density of the device. In some embodiments, the heat transfer element 1124 can be configured such that the volume of liquid in the working chamber 1140 can be reduced by, for example, 50%, 55%, 60%, 65%, 70%, 75%, 80%, 85%, 90%, or 95%.

During the compression cycle, heat energy generated during the compression process can be transferred from the gas, to the heat transfer element 1124, and then to the liquid as described above for previous embodiments. A volume of the heated liquid can then be discharged from the pressure vessel 1120 via the outlet conduit 1130 or via a separate liquid discharge conduit (not shown).

While various embodiments of the invention have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments have been described as having particular features and/or combinations of components, other embodiments are possible having any combination or sub-combination of any features and/or components from any of the embodiments described herein. For example, although certain embodiments of a heat transfer element were shown and described with respect to a particular embodiment of a compression/expansion device, it should be understood that the various embodiments of a heat transfer element can be used in any of the various embodiments of a compression and/or expansion device described herein and in other embodiments of a compress and/or expansion device not described herein.

Additionally, although some embodiments of a compression and/or expansion device include a heat transfer element disposed at a particular location within the pressure vessel, it should be understood that a heat transfer element can be disposed at different locations than those illustrated and described. The specific configurations of the various components of a compression and/or expansion device can also be varied. For example, the size and specific shape of the various components can be different than the embodiments shown, while still providing the functions as described herein.

What is claimed is:

1. An apparatus suitable for use in a compressed gas-based energy storage and recovery system, the apparatus comprising:
    a pressure vessel having a variable volume working chamber and adapted to contain both a liquid and a gas in direct contact, the pressure vessel having a high-pressure gas conduit adapted to introduce high pressure gas into the working chamber;
    a heat transfer element disposed within the working chamber, wherein the pressure vessel is operable: to compress gas in the working chamber and to transfer heat energy from the compressed gas to the heat transfer element; and to expand high pressure gas introduced into the working chamber through the high-pressure gas conduit and to transfer heat energy from the heat transfer element to the expanded gas; and
    a heating subsystem adapted to transfer heat energy from an external environment to the heat transfer element.

2. The apparatus of claim 1, further comprising a liquid conduit through which liquid can be introduced into and discharged from the working chamber.

3. The apparatus of claim 2, wherein the pressure vessel is further operable to transfer heat energy from the heat transfer element to liquid in the working chamber.

4. The apparatus of claim 3, wherein the heat energy is transferred from the heat transfer element to the liquid in the working chamber by contacting the liquid with a surface of the heat transfer element.

5. The apparatus of claim 4, wherein the pressure vessel is further operable to discharge at least a portion of the liquid in the working chamber to remove at least a portion of the heat energy transferred from the heat transfer element to the liquid.

6. The apparatus of claim 2, wherein the pressure vessel is further operable to compress gas in the working chamber by introducing liquid into the working chamber.

7. The apparatus of claim 6, wherein the heat transfer element is disposed within a portion of the working chamber such that, as gas is compressed in the working chamber, progressively more of the liquid and less of the gas is exposed to the heat transfer element.

8. The apparatus of claim 1, wherein the heat transfer element is disposed at an end of the pressure vessel.

9. The apparatus of claim 1, wherein the heat transfer element is substantially cylindrical.

10. The apparatus of claim 9, wherein an outer diameter of the heat transfer element is substantially similar to a diameter of the working chamber.

11. The apparatus of claim 10, wherein a vertical axis of the heat transfer element is parallel to a vertical axis of the working chamber.

12. The apparatus of claim 1, wherein the heat transfer element comprises at least one of a metal spiral, a plurality of interleaved fins, and a wire mesh.

13. The apparatus of claim 1, wherein the heat transfer element comprises a plurality of concentric members having annular spaces therebetween, thereby permitting at least one of a gas and a liquid to flow through the annular spaces.

14. The apparatus of claim 1, wherein the heat transfer element is operable to transfer heat energy received from the compressed gas to an exterior of the working chamber.

15. A method of operating a pressure vessel in a compressed gas-based energy storage and recovery system, the pressure vessel having a variable volume working chamber and a heat transfer element disposed within the working chamber, the pressure vessel adapted to contain both a liquid and a gas in direct contact, the pressure vessel having a high-pressure gas conduit adapted to introduce high pressure gas into the working chamber, the method comprising:
    introducing gas into the working chamber;
    compressing the gas by reducing the volume of the working chamber;
    transferring heat energy from the compressed gas to the heat transfer element;
    introducing high pressure gas into the working chamber through the high-pressure gas conduit;
    expanding the high pressure gas by increasing the volume of the working chamber;
    transferring heat energy from an external environment to the heat transfer element; and
    transferring heat energy from the heat transfer element to the expanded gas.

16. The method of claim 15, wherein the step of reducing the volume of the working chamber comprises introducing liquid into the working chamber.

17. The method of claim 15, wherein the step of increasing the volume of the working chamber comprises discharging liquid from the working chamber.

18. The method of claim 15, further comprising discharging at least a portion of the liquid in the working chamber to remove at least a portion of the heat energy transferred from the heat transfer element to the liquid.

19. The method of claim 15, further comprising disposing the heat transfer element within a portion of the working chamber such that, as gas is compressed in the working chamber, progressively more of the liquid and less of the gas is exposed to the heat transfer element.

20. The method of claim 15, further comprising transferring heat energy from the heat transfer element to the liquid by contacting a surface of the heat transfer element with the liquid.

* * * * *